United States Patent
Midorikawa et al.

(10) Patent No.: US 7,967,984 B2
(45) Date of Patent: Jun. 28, 2011

(54) APPARATUS FOR WATER TREATMENT AND METHOD OF TREATING WATER

(75) Inventors: Ichiro Midorikawa, Tokyo (JP); Akihiro Omori, Tokyo (JP); Tadashi Shimizu, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 738 days.

(21) Appl. No.: 11/922,096

(22) PCT Filed: Jun. 13, 2006

(86) PCT No.: PCT/JP2006/311833
§ 371 (c)(1),
(2), (4) Date: Dec. 13, 2007

(87) PCT Pub. No.: WO2006/134915
PCT Pub. Date: Dec. 21, 2006

(65) Prior Publication Data
US 2010/0264084 A1 Oct. 21, 2010

(30) Foreign Application Priority Data

| Jun. 14, 2005 | (JP) | 2005-174082 |
|---|---|---|
| Jun. 14, 2005 | (JP) | 2005-174083 |
| Jun. 14, 2005 | (JP) | 2005-174084 |
| Jun. 14, 2005 | (JP) | 2005-174085 |
| Jun. 14, 2005 | (JP) | 2005-174086 |
| Jun. 15, 2005 | (JP) | 2005-174753 |
| Jun. 15, 2005 | (JP) | 2005-174754 |

(51) Int. Cl.
*C02F 3/00* (2006.01)

(52) U.S. Cl. ......... 210/616; 210/631; 210/663; 210/665
(58) Field of Classification Search .................. 210/663, 210/665, 616, 631
See application file for complete search history.

(56) References Cited

U.S. PATENT DOCUMENTS 4,952,323 A * 8/1990 Nakabayashi et al. ........ 210/691
2005/0288181 A1 * 12/2005 Tranter et al. ................. 502/400

FOREIGN PATENT DOCUMENTS

| JP | 54-131340 | 10/1979 |
|---|---|---|
| JP | 62-201642 | 9/1987 |
| JP | 63-236588 | 10/1988 |

(Continued)

OTHER PUBLICATIONS

Office Action dated Nov. 27, 2009 corresponding Korean application.

(Continued)

*Primary Examiner* — Chester T Barry
(74) *Attorney, Agent, or Firm* — Finnegan, Henderson, Farabow, Garrett & Dunner, L.L.P.

(57) ABSTRACT

An apparatus for water treatment which comprises a means of removing ingredients contained in water and a means of adsorbing ions with a porous molding as an adsorbent, wherein the porous molding comprises fibrils comprising an organic polymer resin and an inorganic ion adsorbent. The fibrils form interconnecting pores open to the outer surface and have voids in inner parts thereof, at least part of the voids being open to the surface of the fibrils. The inorganic ion adsorbent has been deposited on the outer surface of the fibrils and on the surface of the voids in the fibrils.

34 Claims, 7 Drawing Sheets

FOREIGN PATENT DOCUMENTS

| | | |
|---|---|---|
| JP | 2-102734 | 4/1990 |
| JP | 7-68285 | 3/1995 |
| JP | 7-116685 | 5/1995 |
| JP | 7-256274 | 10/1995 |
| JP | 8-89956 | 4/1996 |
| JP | 9-187646 | 7/1997 |
| JP | 10-85743 | 4/1998 |
| JP | 10-277568 | 10/1998 |
| JP | 10-314798 | 12/1998 |
| JP | 11-235598 | 8/1999 |
| JP | 2001-276814 | 10/2001 |
| JP | 2002-18489 | 1/2002 |
| JP | 2003-340446 | 12/2003 |
| JP | 2004-344848 | 12/2004 |
| JP | 2005-46748 | 2/2005 |
| JP | 2005-66595 | 3/2005 |
| JP | 2005-95741 | 4/2005 |
| KR | 2003-2222 | 1/2003 |
| KR | 2005-20961 | 3/2005 |

OTHER PUBLICATIONS

Wei et al.; "Minimization of Excess Sludge Production for Biological Wastewater Treatment"; Water Research, vol. 37, pp. 4453-4467, (2003).

* cited by examiner

APPARATUS FOR WATER TREATMENT AND METHOD OF TREATING WATER

TECHNICAL FIELD

The present invention relates to an apparatus for water treatment and a method of treating water for reducing and removing a specific ion or all ions of ions contained in water such as sewage, food factory effluent, chemical factory effluent, tap water, sea water, river water, lake water and groundwater to extremely-low concentration.

BACKGROUND ART

As a method of treating organic effluent such as sewage and food factory effluent, there have been known an active sludge method, a biofilm method and a stabilization pond method or the like. However, since excess sludge is generated in large quantity in a treating apparatus in these methods, sludge treating apparatuses such as a dehydrator, a drier and an incinerator are required. Since high phosphor concentration in effluent causes problems such as eutrophication in a closed water area, the concentration of phosphor in the effluent is regulated with those of COD and nitrogen.

In recent years, many organic effluent treatment methods generating little excess sludge have been proposed, and examples thereof include a bacteriolysis-potential increasing method, a maintenance metabolizing method, an uncoupling metabolizing method, a maintenance metabolizing method, and a bacteria preying method (Non-Patent Document 1). The bacteriolysis-potential increasing method dissolves sludge to promote latent multiplication, and examples for dissolving sludge include a chlorine method, a bead mill method, a high revolution disk method, a supersonic method, a hydrothermal method, and a chemical agent adding method in addition to an ozone method described in Patent Document 1 (JP-A-07-116685), a thermophile method described in Patent Document 2 (JP-A-11-235598). Examples of the maintenance metabolizing methods include a membrane bioreactor method described in Patent Document 3 (JP-A-2005-46748). Examples of the uncoupling metabolizing methods include a method using a chemistry uncoupling agent. Examples of the bacteria preying methods include a two-step system.

The above organic effluent treatment methods have an advantage and a disadvantage respectively. However, the methods have a problem that the phosphor concentration in treatment water is increased as compared with the case where excess sludge is generated in large quantity.

Therefore, there has been required a method of treating organic effluent capable of generating excess sludge in small quantity and efficiently reducing the phosphor concentration in the treatment water.

On the other hand, there has been known a method of reducing and removing ions contained in effluent by a precipitaion-sedimentaion treatment or an ion adsorption treatment as a method of treating inorganic effluent which hardly contains organic ingredients such as COD of effluent in a ceramic industry factory. The precipitaion-sedimentaion treatment can treat effluent containing ions to be removed in a comparatively high concentration. However, a chemical agent needs to be added in large quantity in aiming a so-called advanced treatment where the concentration of the ions to be removed in the treatment water is set to 1 mg/L or less, and unfortunately, the sludge is also generated in large quantity.

On the other hand, although the ion adsorption treatment is excellent in the advanced treatment of effluent, an adsorbent is required in large quantity in adsorbing the effluent containing ions to be removed in a high concentration, and the regeneration frequency of the adsorbent is also increased. Accordingly, unfortunately, the chemical agent for the regeneration of the adsorbent is also required in large quantity to increase operating cost.

Then, there has been considered a method of combining the precipitaion-sedimentaion treatment and the ion adsorption treatment in series to treat effluent as a method of solving the problem of each of the precipitaion-sedimentaion treatment and ion adsorption treatment (JP-A-10-314798 (Patent Document 4) and JP-A-2001-276814 (Patent Document 5)). This method roughly removes ions to be removed, the ions contained in the effluent in the precipitaion-sedimentaion treatment, and supplies precipitaion-sedimentaion treatment water in which the ions to be removed are removed to some extent to the subsequent ion adsorption treatment. Since the adsorbent used in the ion adsorption treatment is saturated by the adsorption of a fixed amount, a regeneration treatment is performed using a regenerated solution even in this case. This regeneration treatment produces reproduced drainage containing the ions to be removed, the ions desorbed from the adsorbent. However, the treatment returns the drainage to the precipitaion-sedimentaion treatment to retreat the drainage.

However, there has been required a method of more efficiently providing treatment water containing the ions to be removed in low concentration for inorganic effluent.

Also, there have been known treatments using a reverse osmosis membrane apparatus, an electric deionization apparatus, a distillation apparatus and an ion exchange apparatus using an ion exchange resin or the like as a treating method of providing water having high purity from the inorganic effluent.

However, the case where ions of a certain type cannot be removed to a desired level often occurs from the relationship or the like between the characteristic of each of the treating methods and the concentration of ions contained in raw water provided for the treatment.

For example, treatment water (freshwater) prepared by treating sea water using a reverse osmosis membrane apparatus has water quality mostly satisfying a WHO quality guideline value. However, it is difficult to set only boron to a WHO recommendation value (0.5 ppm) or less.

Therefore, JP-A-10-85743 (Patent Document 6) has proposed a method of treating sea water concurrently using a reverse osmosis membrane apparatus and an ion exchange apparatus using a boron selective ion exchange resin to set the boron concentration to a WHO recommendation value or less.

However, since the boron adsorbing capacity of the boron selective ion exchange resin is not so large, the boron selective ion exchange resin has economical problems such as the increase in the scale of the ion exchange apparatus and the increase in the regeneration frequency and exchange frequency of the ion exchange resin.

Even when the electric deionization apparatus treats tap water to produce ultrapure water, the water quality of ultrapure water may be insufficiently obtained without sufficiently removing boron depending on the type of raw water. Even in this case, water treated by the electric deionization apparatus is post-treated using the ion exchange apparatus using the boron selective ion exchange resin (JP-A-8-89956 (Patent Document 7)). However, the treatment has economical problems such as the increase in the scale of the ion exchange apparatus and the increase in the regeneration frequency and exchange frequency of the ion exchange resin.

As described above, there is need for an apparatus and method capable of efficiently reducing and removing ions contained in water to a low concentration in various water treatment fields.

Patent Document 1: JP-A-07-116685
Patent Document 2: JP-A-11-235598
Patent Document 3: JP-A-2005-46748
Patent Document 4: JP-A-10-314798

Patent Document 5: JP-A-2001-276814
Patent Document 6: JP-A-10-85743
Patent Document 7: JP-A-08-89956
Non-Patent Document 1: Y. Wei et al., "Minimization of excess sludge production for biological wastewater treatment", Water Research, 37 (18), 4453-4467 (2003)

DISCLOSURE OF THE INVENTION

Problem to be solved by the Invention

It is an object of the present invention to provide an apparatus for water treatment and method of treating water which can efficiently reduce and remove a specific ion or all ions of the ions contained in water such as sewage, food factory effluent, chemical factory effluent, tap water, sea water, river water, lake water and groundwater to extremely-low concentration.

Means for Solving the Problem

As a result of having made an extensive investigation for solving the above described problems, the present inventors have found that a porous formed article having a specific structure shows extremely high adsorbing performance to various ions contained in water. The inventors have found that the above problems can be attained by contacting the porous formed article with water, and combining ions-adsorbing means for adsorbing and removing ions contained in water with another means for removing ingredients contained in water, and have accomplished the present invention on the basis of the finding.

That is, the present invention is as follows.

1. An apparatus for water treatment comprising:
means for removing ingredients contained in water; and
means for adsorbing ions with a porous formed article as an adsorbent, wherein
the porous formed article comprises a fibril containing an organic polymer resin, and an inorganic ion adsorbing material;
the fibril forms communicating pores opening at an outer surface of the article and has inner cavities, each of which cavities opens at the surface of the fibril through at least a part of the each cavity; and
the inorganic ion adsorbing material is supported on the outer surface of the fibril and on the surface of inner cavities of the fibril.

2. The apparatus for water treatment according to item 1, wherein the porous formed article has a layer having a maximum pore diameter of a communicating pore in the vicinity of the surface of the formed article.

3. The apparatus for water treatment according to item 1 or 2, wherein the organic polymer resin comprises at least one selected from the group consisting of an ethylene-vinylalcohol copolymer (EVOH), polyacrylonitrile (PAN), polysulphone (PS) and polyvinylidene difluoride (PVDF).

4. The apparatus for water treatment according to any one of the items 1 to 3, wherein the inorganic ion adsorbing material comprises at least one of metallic oxides represented by the following formula (I):

$$MN_xO_n \cdot mH_2O \qquad (I)$$

wherein x is 0 to 3; n is 1 to 4; m is 0 to 6; and M and N are different from each other, and is a metallic element selected from the group consisting of Ti, Zr, Sn, Sc, Y, La, Ce, Pr, Nd, Sm, Eu, Gd, Tb, Dy, Ho, Er, Tm, Yb, Lu, Al, Si, Cr, Co, Ga, Fe, Mn, Ni, V, Ge, Nb and Ta.

5. The apparatus for water treatment according to item 4, wherein the metallic oxide represented by the formula (I) is one or a mixture of two or more selected from the following groups (a) to (c):

(a) hydrated titanium oxide, hydrated zirconium oxide, hydrated tin oxide, hydrated cerium oxide, hydrated lanthanum oxide and hydrated yttrium oxide;

(b) a multiple metallic oxide of a metallic element selected from the group consisting of titanium, zirconium, tin, cerium, lanthanum and yttrium and a metallic element selected from the group consisting of aluminum, silicon and iron; and (c) activated alumina.

6. The apparatus for water treatment according to any one of the items 1 to 5, wherein the fibril comprises the organic polymer resin, the inorganic ion adsorbing material and a water-soluble polymer.

7. The apparatus for water treatment according to any one of the items 1 to 6, wherein the means for removing ingredients contained in water is a combination of biological treatment means and sludge separating means.

8. The apparatus for water treatment according to the item 7, wherein the biological treatment means comprises two or more aeration tanks.

9. The apparatus for water treatment according to the item 7 or 8, wherein the biological treatment means comprises an aeration tank in which a biofilm carrier is immersed.

10. The apparatus for water treatment according to the item 9, wherein the biofilm carrier comprises a core material and a fiber-like material partially fixed to the core material, and the fiber-like material thickly grows around the core material.

11. The apparatus for water treatment according to the item 10, wherein the core material has a helical shape.

12. The apparatus for water treatment according to the item 10 or 11, wherein the fiber-like material is polyvinylidene chloride.

13. The apparatus for water treatment according to any one of the items 7 to 12, wherein the sludge separating means is a membrane separation apparatus having a sedimentation tank and/or a separation membrane.

14. The apparatus for water treatment according to the item 13, wherein the separation membrane of the membrane separation apparatus comprises at least one selected from the group consisting of polyacrylonitrile (PAN), polysulphone (PS), polyvinylidene difluoride (PVDF), polyethylene (PE) and polypropylene (PP).

15. The apparatus for water treatment according to the item 13 or 14, wherein a form of the separation membrane is a hollow fiber form.

16. The apparatus for water treatment according to any one of the items 13 to 15, wherein the separation membrane is a membrane cartridge prepared by adhering and fixing both ends of a plurality of hollow fibers vertically arranged, and has a cartridge head liquid-tightly adhered and fixed to an outer circumference of a first end part and a skirt fixed to an outer circumference of a second end part; the cartridge head is separated from the skirt; an end part of the hollow fiber of the side of the cartridge head is opened; a hollow part of an end part of the hollow fiber of the side of the skirt is sealed; and a plurality of through holes are formed in an adhesive fixing layer of the side of the skirt.

17. The apparatus for water treatment according to any one of the items 7 to 16, further comprising sludge solubilizing means.

18. The apparatus for water treatment according to the item 17, wherein the sludge solubilizing means is at least one selected from a mechanical cell destructive method, an ultrasonic method, an ozone method, a hydrothermal oxidation method, a chemical agent adding method and a thermophile method.

19. The apparatus for water treatment according to the item 1, wherein the means for removing ingredients contained in water is precipitation-sedimentation treatment means.

20. The apparatus for water treatment according to the item 19, further comprising means for returning desorption drainage containing ions, to be removed, the ions generated in regenerating the porous formed article used in the means for adsorbing ions, to the precipitation-sedimentation treatment means.

21. The apparatus for water treatment according to the item 1, wherein the means for removing ingredients contained in water is demineralization treatment means.

22. The apparatus for water treatment according to the item 1, wherein the means for removing ingredients contained in water is direct purifying means.

23. The apparatus for water treatment according to any one of the items 1 to 22, wherein the apparatus for water treatment has means for separating and removing suspended solids in water, said means installed in a previous stage of the means for adsorbing ions.

24. The apparatus for water treatment according to any one of the items 1 to 23, wherein said means for adsorbing ions is a plurality of means for adsorbing ions connected in series and is of a merry-go-round system.

25. The apparatus for water treatment according to the item 24, wherein ion detecting means for monitoring a concentration of ions in treatment water is installed in the means for adsorbing ions of the initial stage.

26. The apparatus for water treatment according to any one of the items 1 to 25, wherein the apparatus for water treatment has means for crystallizing desorbed ions from a desorption solution brought in contact with the porous formed article used in the means for adsorbing ions, and solid-liquid separation means for a crystallized substance.

27. The apparatus for water treatment according to the item 26, further comprising means for cooling the desorption solution.

28. A method of treating water comprising:
    a step of removing ingredients contained in water; and
    an ion adsorption treatment step of using a porous formed article as an adsorbent, wherein
    the porous formed article comprises a fibril containing an organic polymer resin, and an inorganic ion adsorbing material;
    the fibril forms communicating pores opening at an outer surface of the article and has inner cavities, each of which cavities opens at the surface of the fibril through at least a part of the each cavity; and
    the inorganic ion adsorbing material is supported on the outer surface of the fibril and on the surface of inner cavities of the fibril.

29. The method of treating water according to the item 28, wherein the step of removing ingredients contained in water is a combination of a biological treatment step and a sludge separating step.

30. The method of treating water according to the item 29, further comprising a sludge solubilizing step.

31. The method of treating water according to the item 28, wherein the step of removing ingredients contained in water is a demineralization treatment step.

32. The method of treating water according to the item 28, wherein the step of removing ingredients contained in water is a precipitaion-sedimentaion treatment step.

33. The method of treating water according to the item 32, further comprising the step of returning desorption drainage containing ions to be removed, the ions generated in regenerating the porous formed article used in the ion adsorption treatment step, to the precipitaion-sedimentaion treatment step.

34. The method of treating water according to the item 28, wherein the step of removing ingredients contained in water is a direct purifying step.

The present invention can efficiently reduce and remove a specific ion or all ions of the ions contained in water such as sewage, food factory effluent, chemical factory effluent, tap water, sea water, river water, lake water and groundwater to extremely-low concentration at low cost.

BEST MODE FOR CARRYING OUT THE INVENTION

Figure 1:
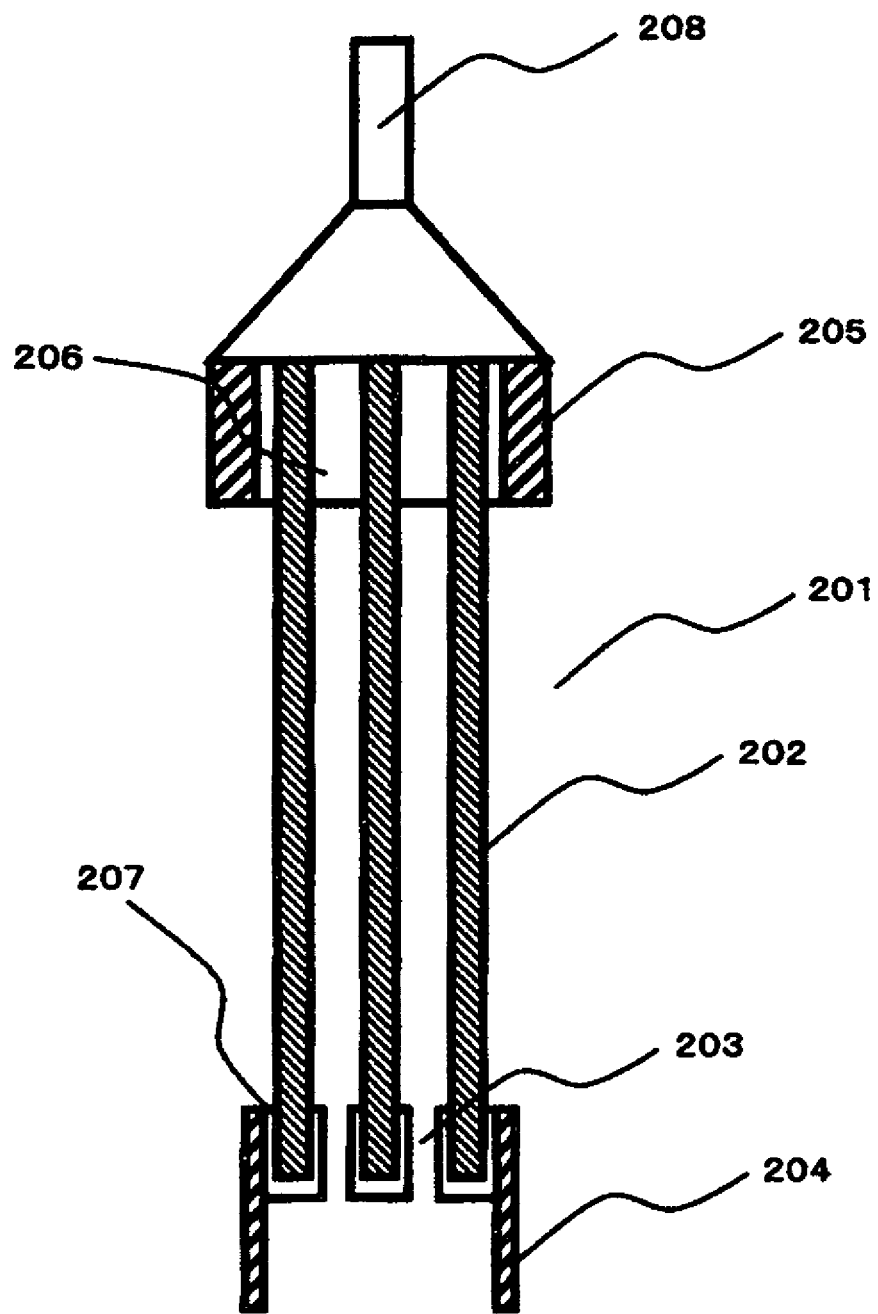
FIG. 1 is a schematic view of a hollow fiber cartridge used for the present invention.

Hereinafter, the present invention will be described.

"Means for removing ingredients contained in water" used in the present invention removes soluble ingredients such as BOD, COD and inorganic ions contained in water, and examples thereof include a combination of biological treatment means and sludge separating means, precipitation-sedimentaion treatment means, demineralization treatment means, and direct purifying means.

The biological treating means is not particularly limited. However, specific examples thereof include active sludge methods such as a standard active sludge method, a standard aeration method, a long time aeration method, an oxidation ditch method, a batch method and a membrane bioreactor method, biofilm methods such as a contact oxidation method, a trickling filter method, an immersion filter method, a rotating disk method, a fluid bed method and a biological filtering method, and aerobic treatments such as a stabilization pond methods such as a high speed oxidation tank method and a facultative oxidation pond method. As needed, there can be concurrently used at least one of: an anaerobic treatment such as an anaerobic decomposition method such as an anaerobic nitrifying method, a lagoon method, a decomposition tank method and an anaerobic filter method; a treatment using a specific biological such as photosynthesis bacteria, yeast and chlorella; a treatment of a nutrient such as biological nitrogen removal and biological phosphorus removal and a treatment utilizing a natural purification function such as a lake, a waterway and soil.

Although it is recommended that at least an aeration tank exists as the biological treatment means of the present invention, two or more tanks are preferable since the tanks reduce the generation of excess sludge. Also, since excessive tanks increase the production cost, three to six aeration tanks are more preferable.

The contact oxidation method is preferable as the biological treatment means of the present invention since method decreases the generation of excess sludge. The contact oxidation method immerses a biofilm carrier as a carrier multiplying and acclimatizing microorganisms in an aeration tank to aerate the biofilm carrier. Although the biofilm carrier is not particularly limited, examples of the shape thereof include a honeycomb, spiral, hollow, sponge, network, rod and line shapes. The spiral shape is preferable since many microorganisms can live and the flow of the aeration tank is enhanced. Also, the biofilm carrier which includes a core material and a fiber-like material partially fixed to the core material, and in which the fiber-like material is thickly grown around the core material is preferable. Also, the shape of the core material is not limited, and the biofilm carrier in which the core material has a helical shape is preferable.

Metals such as soft iron, aluminum and copper or plastics such as flexible vinyl chloride can be used for the core material. Waterproofing coating and plastic coating can be applied on the metal core material so as to suppress the corrosion. The diameter of the core material, which is different according to materials, is preferably 1 mm or more and 7 mm or less. Furthermore, the quality of material of the fiber-like material is not particularly limited. However, examples of the materials include polyethylene, polypropylene, polyester, polyamide, polyvinyl chloride, polyvinylidene chloride, polyvinylidene fluorine and polyurethane. Polyvinylidene chloride is preferable since polyvinylidene chloride has good adherability of microorganisms.

A biofilm carrier block prepared by holding a plurality of biofilm carrier on a frame made of a suitable corrosion-resistant material can be immersed and used in the aeration tank. Although it is recommended that the biofilm carrier block having a height suitable for the water depth of the aeration tank is used, the height is preferably 0.5 m or more and 6 m or less, and more preferably 2 m or more and 4 m or less.

As for the amount of the biofilm carrier to be used, the surface area of the biofilm carrier per 1 $m^2$ of the projected floor area of the biofilm carrier block is preferably 100 $m^2$ or more and 3000 $m^2$ or less. The surface area, when being 100 $m^2$ or more, provides the excellent efficiency of the installation area of the apparatus. The surface area, when being 3000 $m^2$ or less, exhibits an airlift effect due to aeration to provide a uniform revolution style and an environment where microorganisms tend to grow up. The surface area is more preferably 250 $m^2$ or more and 350 $m/^2$ or less.

The sludge separating means combined with the biological treatment means is not particularly limited in the present invention. However, a membrane separation apparatus such as a sludge sedimentation tank, a screen, a microfiltration membrane and an ultrafiltration membrane can be used. These can be also concurrently used. Since the membrane separation apparatus can also remove minute SS (Suspended Solid), the clogging of the means for adsorbing ions can be preferably prevented.

It is more preferable that the membrane bioreactor method using an immersion membrane has an effect obtained by concurrently using the biological treatment means and the sludge separating means.

In order to enhance the concentration of sludge, the sludge separating means and a concentration apparatus such as centrifugal concentration, surfacing concentration, evaporation concentration or membrane concentration can be also concurrently used.

A membrane bioreactor introduces raw water into an aeration tank where the raw water is subjected to a biological treatment, introduces a biological treatment solution containing the sludge in the aeration tank into a separation membrane immersed in the tank, and takes out permeable water of the separation membrane as treatment water.

The separation membrane used for the membrane bioreactor of the present invention is not particularly limited. However, as the separation membrane, an MF (microfiltration) membrane and a UF (ultrafiltration) membrane are preferable in view of the excellent balance of filtration accuracy and permeable water amount.

The material of the membrane includes many kinds of polymers such as polysulfone polymer, polyvinylidene fluorine polymer, polyvinylidene chloride polymer, polyolefin polymer, acrylonitrile polymer, poly(methyl methacrylate) polymer, polyamide polymer, polyimide polymer, cellulosic polymer and ethylene-vinylalcohol-copolymer polymer. It is particularly preferable that the membrane includes at least one kind selected from the group consisting of polyacrylonitrile (PAN), polysulphone (PS), polyvinylidene difluoride (PVDF), polyethylene (PE) and polypropylene (PP) from the viewpoint of an unswelling property and biodegradation resistance in water, and productionability.

A form of the membrane is not limited, and includes, for example, a flat membrane, a hollow fiber, a pleat, a spiral and a tube. However, a hollow fiber is preferable in point of the wide membrane area.

Since a biological treatment solution having a high MLSS (Mixed Liquor Suspended Solid) concentration is filtered in the membrane bioreactor method, the biological treatment solution is easily clogged. It is necessary to effectively clean the membrane surface using air in order to obtain stable permeable water.

A membrane cartridge having the following structure is particularly preferable in order to effectively clean the membrane surface using air.

An embodiment of a hollow fiber cartridge according to the present invention will be described with reference to FIG. 1.

In FIG. 1, a hollow fiber cartridge 201 includes a plurality of hollow fibers 202, an upper adhesive fixing layer 206, a lower adhesive fixing layer 207, a cartridge head 205 and a skirt 204. One end parts of the bundled hollow fibers 202 are integrally combined by an adhesive, and are integrally combined in the cartridge head 205 to constitute the upper adhesive fixing layer 206. The end part of the hollow fiber 202 of the side of the cartridge head 205 is opened. The other end parts of the hollow fibers 202 are integrally combined by the adhesive, and are integrally combined in the skirt 204 to constitute the lower adhesive fixing layer 207. However, the end parts of the hollow fibers 202 are sealed. A plurality of through holes 203 for introducing raw water and cleaning gas into the hollow fiber bundle and effectively contacting with the outer circumferential face of the hollow fiber are formed in the lower adhesive fixing layer 207.

The biological treatment solution in the aeration tank is filtered from the outer surface of the hollow fiber; is passed through a hollow part in the hollow fiber; is passed through a treatment water outlet 208; and is sent to the means for adsorbing ions as the following step.

The quality of material of the adhesive is preferably a polymer material such as an epoxy resin, a urethane resin, an epoxy acrylate resin and a silicon resin.

Although the quality of material of the cartridge head 205 and skirt 204 is not particularly limited, the quality of material is preferably a thermoplastic resin or stainless steel.

Preferably, the through hole has a diameter of 2 to 35 mm.

The skirt 204 is downwardly projected from the end face of the hollow fiber and is fixed. Although the projected length depends on the diameter of the cartridge and the amount of air, the length is preferably 5 to 500 mm. The hollow fiber 202 preferably has an inner diameter of 50 to 3000 μm and an inner/outer diameter ratio of 0.3 to 0.8.

When the combination of the biological treatment means and sludge separating means as the means for removing ingredients contained in water is used in the present invention, the order of the combination of them and the means for adsorbing ions using the porous formed article as the adsorbent is not particularly limited. However, it is preferable to install the means for adsorbing ions in the subsequent stage of the biological treatment means and sludge separating means from a viewpoint of the efficiency of ion adsorption.

When the combination of the biological treatment means and sludge separating means is used as the means for removing ingredients contained in water, it is also preferable to combine sludge solubilizing means.

The sludge solubilizing means used in the present invention solves a part or all of sludge mainly containing microorganisms generated in the biological treatment means or the sludge separating means in water so as to be suitable for destroying the cell walls and formations of the microorganisms, depolymerizing a high polymer, and subjecting the sludge to the biological treatment means again by a physical, chemical or biological technique, or the combined use thereof.

The sludge solubilizing means is not particularly limited. However, examples thereof include a mechanical cell destructive method, a supersonic method, an ozone method, a hydrothermal oxidation method, a medical agent adding method and a thermophile method. Examples of the mechanical cell destructive methods include a bead mill method and a high revolution disk method. The bead mill method introduces sludge into a mill chamber filled with beads, stirs the sludge at high speed, and destroys the sludge using a shearing friction force generated between the beads. The high revolution disk method passes the sludge through a space between disks rotated at high speed, and destroys the sludge using a shearing force generated between the disks and mashing. The supersonic method introduces sludge to an ultrasonic tank, and destroys the sludge using pressure waves and cavitations ultrasonically generated. The method has an advantage that power required for the destruction is small.

The ozone method introduces sludge into an ozonization tank, annihilates the sludge using the oxidizing power of ozone to destroy a cell membrane. The method is suitable when the biological treatment means is the oxidation ditch method and the long time aeration method. The hydrothermal oxidation method introduces sludge to a hydrothermal treatment tank, treats the sludge at high temperatures and pressures (under a subcritical condition), and completely dissolves a cell to convert the sludge into a low molecular compound. The method has an advantage that the reaction time can be reduced and the hydrothermal treatment tank can be miniaturized. The chemical agent adding method adds a chemical agent such as an oxidizing agent such as hydrogen peroxide, alkali such as sodium hydroxide, and acid such as sulfuric acid to sludge, and particularly heat the sludge. The method has an advantage that the reaction is easily controlled using a chemical agent and electric power cost is low.

In the thermophile method, the sludge is heated and is solubilized by thermophile such as *Bacillus stearothermophilus*. In addition, enzyme generated and secreted from the thermophile promotes the solubilization of the sludge. The thermophile method is preferable since the thermophile method uses a simple apparatus and requires no chemical agent or the like particularly. As for the conditions of the thermophile method, it is preferable that the temperature is 50 to 80° C.; the sludge concentration is 1000 mg/L or more; pH is 7 to 9; and HRT (Hydraulic Retention Time) is 3 to 24 hours.

In order to separate the sludge solubilized by the sludge solubilizing means and the unsolubilized sludge, a solid-liquid separating apparatus such as a membrane filter can be concurrently used. As for the filtration membrane used for the membrane filter, an ultrafiltration membrane and a microfiltration membrane or the like can be used as the membrane material. A hollow fiber shape and a flat membrane shape can be used as the shape. A polyethylene-based resin, a polyacrylonitrile-based resin, a polysulphone-based resin, a polyvinylidene fluoride-based resin and an acetylcellulose-based resin can be used as the quality of material. The polysulphone-based resin and the polyvinylidene fluoride-based resin are preferable in view of heat resistance and chemical resistance. A spiral type and hollow fiber type, tubular type, and plate type membrane modules or the like can be used.

As for the order in which the biological treatment means, the sludge separating means, the sludge solubilizing means and the means for adsorbing ions are combined, it is preferable that the means for adsorbing ions is installed in the subsequent stage of the biological treatment means, sludge separating means and sludge solubilizing means.

Next, specific examples of the demineralization treatment means used as the means for removing ingredients contained in water in the present invention include known demineralization treatment means such as a reverse osmosis membrane apparatus, an electric deionization apparatus, a distillation apparatus and an ion exchange apparatus using an ion-exchange resin. Each of the apparatuses may be independently used for the demineralization treatment means, and the plurality of reverse osmosis membrane apparatuses of the same type may be installed in multi stage in series. A plurality of types of apparatuses may be combined. The plurality of apparatuses can be combined in an optional order in combining the apparatuses and treating the sludge.

The order for combining the demineralization treatment means with the means for adsorbing ions using the porous formed article as the adsorbent is not particularly limited in the present invention. It is recommended that the order is determined based on the situation.

Examples of the precipitaion-sedimentaion treatment means used as the means for removing ingredients contained in water in the present invention include a conventionally known precipitaion-sedimentaion treatment carried out in an industry effluent treatment and a sewage treatment or the like. For example, when phosphor is an ion to be removed, there is used a method of adding an aluminum salt such as aluminum sulfate (aluminium sulfate) and polyaluminum chloride (PAC), an iron salt such as ferrous sulfate and ferric chloride, and an inorganic precipitating agent represented by calcium hydroxide to flocculate and precipitate phosphorus.

When boron is an ion to be removed, there is used a method of adding an aluminum salt, an iron salt, a magnesium salt and a calcium salt to flocculate and precipitate boron, and a method of concurrently using an aluminum salt and a calcium hydroxide to flocculate and precipitate boron.

When fluorine is an ion to be removed, there is used a method of adding a calcium salt to precipitate and sediment fluorine as calcium fluorine, and a method of adding an aluminum salt or a magnesium salt to precipitate, sediment and remove fluorine using aluminium hydroxide or magnesium hydroxide deposited under an alkali condition.

When arsenic is an ion to be removed, there is used a method of adding an iron salt to precipitate and sediment arsenic.

Although the order for combining the precipitaion-sedimentaion treatment means with the means for adsorbing ions using the porous formed article as the adsorbent is not particularly limited in the present invention, the means for adsorbing ions is preferably installed in a subsequent stage.

The direct purifying means used as the means for removing ingredients contained in water in the present invention is not particularly limited. The direct purifying means is roughly divided into a direct method of extemporarily purifying polluted water in river or pond and a separation method of pumping polluted water and purifying the pumped polluted water in a constructed reaction vessel. Examples of the direct methods include an aeration method, a purifying water dilution method, an underfloor purifying method, a thin laminar flow purifying method, a sedimentation pond method, a low mud dredging method, a seaweed/water plant recovering method, a biofilm carrier filling waterway purifying method, a activated carbon purifying method and an water plant planting method.

Examples of the separation methods include an intergravel contact oxidation method, a sand filtering method and a flocculation-sedimentation method. Since the separation method requires a vast site independently or an advanced institution, the direct method is preferable. The water plant planting method is particularly preferable since the method can maintain a rich biogeocenosis and reduce environmental load. Examples of the water plants include emerging plant, floating plant, submerged plant and floating-leaved plant. The emerging plant is preferable since the emerging plant has advantages such as intense fertility, closed vegetation, little moisture and reusability. Examples of the emerging plants include rush, rice, watercress, cattail, narrow-leaved cattail, ipomoea aquatica, papyrus, Indian rice, and common reed grass. Common reed grass is particularly preferable since common reed grass can form a swamp where a biomass conversion operation acts in several steps.

Although the order for combining the direct purifying means with the means for adsorbing ions using the porous formed article as the adsorbent in the present invention is not particularly limited, the means for adsorbing ions is preferably installed in a subsequent stage.

Next, "means for adsorbing ions with a porous formed article as an adsorbent" used in the present invention will be described in detail. "Means for adsorbing ions with a porous formed article as an adsorbent" used in the present invention is not included in "means for removing ingredients contained in water" used in the present invention.

A porous formed article having a special structure is used for an ion adsorption treatment in the present invention. First of all, the structure of the formed article will be described.

The formed article according to the present invention has communicating pores formed of a fibril and a porous structure. Furthermore, the formed article has no skin layer on the outer surface and a high opening ratio at the surface. In the formed article of the present invention, the fibril forming the communicating pores has cavities in the inside, and at least a part of the cavities opening at the surface of the fibril.

The opening ratio at the outer surface of the formed article according to the present invention refers to the ratio of the total opening area of all pores with respect to an area of a visual field shown when the surface is observed with a scanning electron microscope. In the present invention, the opening ratio at the outer surface was measured by observing the surface of the formed article with a magnification of 10,000 times. A range of the opening ratio at the surface is preferably 10 to 90%, and particularly preferably is 15 to 80%. When the opening ratio is less than 10%, ions to be adsorbed such as phosphor diffuses into the formed article at low speeds, and on the other hand, when the opening ratio is more than 90%, the formed article acquires insufficient strength, and it is difficult to achieve a formed article with excellent mechanical strength. A diameter of the opening at the outer surface of the formed article according to the present invention is determined by observing the surface with the scanning electron microscope. When the pore has a circular shape, the diameter of the opening is used as the pore diameter, and when the pore has other shape than the circular shape, the circle-equivalent diameter of a circle having the same area is used as the pore diameter. The range of the diameter of the opening at the surface is preferably 0.005 to 100 μm, and particularly preferably is 0.01 to 50 μm. When the diameter of the opening is smaller than 0.005 μm, a substance to be adsorbed such as phosphor diffuses into the formed article at low speeds, and on the other hand, when the diameter of the opening is larger than 100 μm, the formed article tends to acquire insufficient strength.

A formed article according to the present invention has also cavities in a fibril which forms communicating pores, and each of the cavities opens at the surface of the fibril through at least a part of the each cavity. An inorganic ion adsorbing material is supported on the outer surface of the fibril and the surface of the cavities inside the fibril. Because the fibril in itself is also porous, the inorganic ion adsorbing material which is an adsorption substrate embedded therein can also contact with ions to be adsorbed such as phosphorus and can effectively function as an adsorbent. Since the porous formed article according to the present invention provides porosity also at a portion supporting the adsorption substrate as described above, the porous formed article seldom shows a phenomenon that a binder plugs a fine adsorption site of the adsorption substrate, which has been a defect of a conventional method of producing a porous formed article after having kneaded the adsorption substrate and the binder, and can effectively make use of the adsorption substrate.

Herein, the fibril refers to a fibrous structure which contains an organic polymer resin and forms a three-dimensionally continuous network structure on the outer surface and the inside of the formed article. The cavities in the fibril and the openings of the fibril surface are determined by observing the torn surface of the formed article with a scanning electron microscope. It is observed that there are cavities in the cross section of the fibril and the surface of the fibril is opened. Furthermore, it is observed that the powder of an inorganic ion adsorbing material is supported on the cavity surface, on the outer surface and in the inside of the fibril. A diameter of the fibril is preferably 0.01 to 50 μm. A diameter of the openings on the fibril surface is preferably 0.001 to 5 μm.

Preferably, a porous formed article according to the present invention has a layer having a maximum pore diameter in a communicating pore in the vicinity of the surface of the formed article. Herein, the layer having a maximum pore diameter refers to a part having the largest pore diameter in a pore distribution of the communicating pores reaching to the inside from the surface of the formed article. When the formed article has a large cavity with a circular form or an ellipse form (finger form) referred to as a void, the layer having the maximum pore diameter refers to a layer in which the void exists. The vicinity of the surface means a part inward from the outer surface to the center of the formed article, by 25% of a torn surface diameter. Because the layer having the maximum pore diameter exists in the vicinity of the formed article surface, the formed article has an effect of promptly diffusing a substance to be adsorbed into the inside. Accordingly, the formed article can quickly take the ions to be adsorbed such as phosphorus inside, and remove it from treatment water.

The maximum pore diameter and a position of the layer having the maximum pore diameter are determined by observing the surface and the torn surface of the formed article with a scanning electron microscope. When the pore has a circular shape, the diameter of the opening is used as the pore diameter, and when the pore has a shape other than the circular shape, the circle-equivalent diameter of a circle having the same area is used as the pore diameter. The form of the formed article can be an arbitrary form such as a particulate shape, a thready form, a sheet form, a hollow fiber form, a columnar form and a hollow cylindrical form. Above all, when the formed article is used as an adsorbent in the field of water treatment, it has preferably a particulate shape from the viewpoint of a pressure loss occurring when the formed article is packed in a column and water is passed therethrough, an effectivity of a contact area and handleability, and particularly preferably is a spherical particle (which may be not only a spherical form but also an ellipse spherical form).

An average particle diameter of a spherical formed article according to the present invention is a mode diameter (modal particle diameter) of a sphere-equivalent diameter determined from an angle distribution of scattered light intensity in diffraction with the use of a laser beam, while considering the particle as a spherical shape. The average particle diameter is preferably in a range of 100 to 2,500 µm, and particularly preferably is in a range of 200 to 2,000 µm. When the average particle diameter is smaller than 100 µm, a pressure loss tends to increase when the formed article is packed in a column or a tank, and when the average particle diameter is larger than 2,500 µm, the surface area becomes small when the formed article is packed in a column or a tank, which tends to decrease treatment efficiency.

A porosity Pr (%) of the formed article according to the present invention refers to a value expressed by the following expression, when W1 (g) is defined as a weight of the formed article in a state of containing water, W0 (g) as a weight after being dried, and ρ as a specific gravity of the formed article.

$$Pr=(W1-W0)/(W1-W0+W0/\rho)\times 100$$

It is recommended to measure the weight in the state of containing water, by spreading a sufficiently-water-wet formed article on dry filter paper to remove excess water and weighing thus treated formed article. As a drying method, a vacuum drying is recommended which dries the formed article in a vacuum atmosphere under room temperature so as to remove moisture. The specific gravity of the formed article can be easily measured with the use of a pycnometer.

The porosity Pr (%) is preferably in a range of 50 to 90%, and particularly preferably is in a range of 60 to 85%. When the porosity is less than 50%, the contact frequency of ions to be adsorbed such as phosphor with an inorganic ion adsorbing material of an adsorption substrate tends to be insufficient. When the porosity is more than 90%, the formed article tends to acquire insufficient strength.

An amount of a supported inorganic ion adsorbing material in a formed article according to the present invention refers to a value expressed by the following expression, when Wd (g) is defined as a weight of the formed article in a state of being dried, and Wa (g) is defined as the weight of an ash content in the formed article.

Amount (%) of supported inorganic ion adsorbing material=$Wa/Wd\times 100$

Herein, the ash content refers to a retained material after the formed article according to the present invention is fired at 800° C. for two hours.

The amount of the supported inorganic ion adsorbing material is preferably in a range of 30 to 95%, further preferably is in a range of 40 to 90%, and particularly preferably is in a range of 65 to 90%. When the amount of the supported inorganic ion adsorbing material is less than 30%, the contact frequency of ions to be adsorbed such as phosphor with an inorganic ion adsorbing material of an adsorption substrate tends to be insufficient, and when it is more than 95%, the formed article tends to acquire insufficient strength.

Since a method according to the present invention kneads an adsorption substrate and an organic polymer resin and produces a formed article, in contrast to an impregnation method of a conventional technology, the method can provide a formed article which supports a large amount of the adsorption substrate thereon and has high strength.

A specific surface area of a formed article according to the present invention is defined in the following expression.

Specific surface area (m$^2$/cm$^3$)=$S_{BET}\times$bulk specific gravity (g/cm$^3$)

Herein, $S_{BET}$ is the specific surface area (m$^2$/g) per unit weight of the formed article.

The specific surface area is measured with the BET method after vacuum-drying the formed article at room temperature.

The bulk specific gravity of the formed article having a short shape such as a particulate shape, a columnar shape and a hollow cylindrical shape is determined by measuring an apparent volume of the formed article in a wet condition, with the use of a measuring cylinder or the like. Subsequently, the formed article is vacuum-dried at room temperature to measure the weight.

The bulk specific gravity of the formed article having a long shape such as a thready shape, a hollow fiber shape and a sheet shape is determined by measuring a cross section and a length in a wet state, and calculating the volume from the product of both values. Subsequently, the formed article is vacuum-dried at room temperature to measure the weight.

The specific surface area is preferably in a range of 5 to 500 m$^2$/cm$^3$. When the specific surface area is less than 5 m$^2$/cm$^3$, the amount of the supported adsorption substrate and an adsorption performance tend to be insufficient. When the specific surface area is more than 500 m$^2$/cm$^3$, the strength of the formed article tends to be insufficient.

In general, the adsorption performance (adsorption capacity) of an inorganic ion adsorbing material of an adsorption substrate is proportionate to the specific surface area, in many cases. When the surface area per unit volume is small, the adsorption capacity and the adsorption performance of an inorganic ion adsorbing material are low when the formed body is packed in a column or a tank, so that the column or the tank hardly achieves high-speed treatment.

A porous formed article used as the adsorbent in the means for adsorbing ions of the present invention is porous and has a three-dimensional network structure in which fibrils are complicatedly entangled. Furthermore, the formed article has a feature of having a large surface area, because the fibril in itself has cavities. Since the formed article further supports an adsorption substrate (inorganic ion adsorbing material) having a larger specific surface area thereon, the formed article has a feature that the surface area per unit volume is large.

Next, a method of producing a porous formed article used as the adsorbent in the means for adsorbing ions of the present invention will be described.

The method of producing the porous formed article used as the adsorbent in the means for adsorbing ions of the present invention is characterized in that the method comprises: mixing an organic polymer resin, a good solvent therefor, an inorganic ion adsorbing material and a water-soluble polymer; forming the mixture into the form; and solidifying it in a poor solvent.

An organic polymer resin used in the production is not particularly limited, but is preferably a resin which can be made porous by a wet type phase-separation process. The resin includes many kinds of polymers such as polysulfone-based polymer, polyvinylidene fluorine-based polymer, polyvinylidene chloride-based polymer, acrylonitrile-based polymer, poly(methyl methacrylate)-based polymer, polyamide-based polymer, polyimide-based polymer, cellulosic polymer and ethylene-vinylalcohol copolymer-based polymer. A particularly preferred resin is ethylene-vinylalcohol copolymer (EVOH), polyacrylonitrile (PAN), polysulfone (PS) and polyvinylidene difluoride (PVDF), from the viewpoint of an unswelling property and biodegradation resistance in water, and productionability; and ethylene-vinylalcohol copolymer (EVOH) is further preferable, in point of having both of hydrophilicity and chemical resistance.

In addition, a good solvent used in the production can be any solvent as long as it can dissolve both an organic polymer resin and a water-soluble polymer therein. Examples of the solvents include dimethylsulfoxide (DMSO), N-methyl-2 pyrrolidone (NMP), dimethylacetamide (DMAC) and dimethylformamide (DMF). These good solvents may be used either in a single form or a mixed form. A content of the organic polymer resin in the good solvent is not particularly limited, but is preferably 5 to 40% by weight, and more preferably is 7 to 30% by weight. When the content is less than 5% by weight, it is difficult to obtain a formed article with strength. When the content is more than 40% by weight, it is difficult to obtain the porous formed article with high porosity. The water-soluble polymer used in the production is not particularly limited as long as it has compatibility with the organic polymer resin.

The water-soluble polymer includes a natural polymer such as guar gum, locust bean gum, carrageenan, gum arabic, tragacanth, pectin, starch, dextrin, gelatine, casein and collagen; a semisynthetic high polymer such as methyl cellulose, ethyl cellulose, hydroxyethyl cellulose, ethyl hydroxyethyl cellulose, carboxymethyl starch and methyl starch; further a synthetic high polymer such as polyvinyl alcohol, polyvinylpyrrolidone, polyvinyl methyl ether, carboxyvinyl polymer, sodium polyacrylate; and further a polyethylene glycol such as tetraethylene glycol and triethylene glycol. Among these water-soluble polymers, the synthetic high polymer is preferable because of having biodegradation resistance.

It is particularly preferable to use polyvinylpyrrolidone as the water-soluble polymer, because it has an excellent effect of developing a structure having cavities inside a fibril forming communicating pores, like a formed article used in the present invention in particular. A weight average molecular weight of polyvinylpyrrolidone is preferably in a range of 2,000 to 2,000,000, more preferably is in a range of 2,000 to 1,000,000, and still more preferably is in a range of 2,000 to 100,000. When the weight average molecular weight is less than 2,000, the polyvinylpyrrolidone tends to decrease an effect of developing a structure having cavities in a fibril. When the weight average molecular weight is more than 2,000,000, the polyvinylpyrrolidone tends to increase the viscosity of the solution used for forming, and hardly make the solution formed into an article.

A content of a water-soluble polymer in a porous formed article used in the present invention refers to a value represented by the following expression, when Wd (g) is defined as a weight of the formed article in a state of having been dried, and Ws (g) is defined as the weight of the water-soluble polymer extracted from the formed article.

Content (%)=$Ws/Wd \times 100$

The content of the water-soluble polymer is preferably 0.001 to 10%, and more preferably is 0.01 to 1%, though depending on a type and the molecular weight of the water-soluble polymer. When the content is less than 0.001%, the water-soluble polymer does not always sufficiently show the effect of opening the surface of the formed article, and when the content is more than 10%, polymer concentration is relatively decreased, which occasionally makes the strength insufficient.

Herein, the weight Ws of the water-soluble polymer in the formed article is measured as described below. At first, determine the weight of the extracted water-soluble polymer by the steps of: pulverizing a dried formed article in a mortar or the like; extracting the water-soluble polymer from the pulverized substance with the use of a good solvent for the water-soluble polymer; and subsequently evaporating the extract to dry it.

Furthermore, an infrared absorption spectrum (IR) or the like can identify the extracted evaporated-and-dried substance, and confirm whether the water-soluble polymer remains unextracted in the fibril. When the water-soluble polymer remains unextracted in the fibril, the content of the water-soluble polymer can be quantified by the steps of: dissolving the porous formed article with the good solvent for both an organic polymer resin and the water-soluble polymer; removing an inorganic ion adsorbing material with a filter to prepare a filtrate; and subsequently analyzing the filtrate with the use of GPC or the like.

The content of the water-soluble polymer can be appropriately adjusted by changing a combination of the molecular weight of the water-soluble polymer, an organic polymer resin and a good solvent therefor. For example, the use of the water-soluble polymer with the high molecular weight can increase the content, because the water-soluble polymer is strongly entangled with the organic polymer resin through their molecule chains, and hardly migrates to a poor solvent side when the solution will be formed into the article.

An inorganic ion adsorbing material contained in a porous formed article used in the present invention refers to an inorganic substance showing an ion-adsorption phenomenon.

For example, the inorganic ion adsorbing material includes a natural product such as zeolite, montmorillonite and various mineral substances; and a synthetic material such as a metallic oxide. In the former, a representative substance includes kaolin mineral which is aluminosilicate and has a monolayer lattice, muscovite with a two-layer lattice structure, glauconite, kanuma soil, pyrophyllite, talc, feldspar with a three-dimensional framing structure and zeolite. In the latter, a principal compound includes a salt of a polyvalent metal, a metallic oxide, an insoluble heteropolyacid salt and an insoluble hexacyanoferrate.

The salt of the polyvalent metal includes a hydrotalcite-based compound shown in the following formula (II):

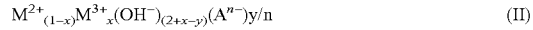
$$M^{2+}{}_{(1-x)}M^{3+}{}_{x}(OH^-)_{(2+x-y)}(A^{n-})y/n \qquad (II)$$

wherein $M^{2+}$ represents at least one bivalent metal ion selected from the group consisting of $Mg^{2+}$, $Ni^{2+}$, $Zn^{2+}$, $Fe^{2+}$, $Ca^{2+}$ and $Cu^{2+}$; $M^{3+}$ represents at least one trivalent metal ion selected from the group consisting of $Al^{3+}$ and $Fe^{3+}$; and $A^{n-}$ represents an n-value anion; x represents a value satisfying 0.1≦x≦0.5; y represents a value satisfying 0.1≦y≦0.5; and n is 1 or 2).

The metallic oxide can be represented by the following formula (I).

$$MN_xO_n \cdot mH_2O \qquad (I)$$

where x is 0 to 3; n is 1 to 4; m is 0 to 6; and M and N are different from each other, and selected from the group consisting of Ti, Zr, Sn, Sc, Y, La, Ce, Pr, Nd, Sm, Eu, Gd, Tb, Dy, Ho, Er, Tm, Yb, Lu, Al, Si, Cr, Co, Ga, Fe, Mn, Ni, V, Ge, Nb and Ta.

The metallic oxide used in the present invention may be an unhydrated (nonhydrous) metallic oxide in which m in the formula (I) can be represented by 0, and may be a hydrated (hydrous) metallic oxide in which m can be represented by a numerical value other than zero.

The metallic oxide in which x in the formula (I) is a numerical value other than zero is a multiple metallic oxide represented by the chemical formula in which the contained metallic elements are regularly and uniformly distributed over the whole oxide to form, for example, a perovskite structure and a spinel structure or the like, and the composition ratio of each metallic element contained in a metallic oxide such as nickel ferrite ($NiFe_2O_4$) and a hydrated oxide ($Zr \cdot Fe_2O_4 \cdot mH_2O$, and m is 0.5 to 6) of iron of zirconium is uniformly defined.

The inorganic ion adsorbing material to be supported on the porous formed article according to the present invention preferably is a metallic oxide or a mixture of two or more metallic oxides represented by the formula (I) and selected from any of groups of following items (a) to (c) because the inorganic ion adsorbing material has an excellent adsorption performance for P, B, F and As:

(a) hydrated titanium oxide, hydrated zirconium dioxide, hydrated tin oxide, hydrated cerium oxide, hydrated lanthanum oxide and hydrated yttrium oxide;

(b) a multiple metallic oxide of a metallic element selected from the group consisting of titanium, zirconium, tin, cerium, lanthanum and yttrium and a metallic element selected from the group consisting of aluminum, silicon and iron; and (c) activated alumina.

Activated alumina impregnated with aluminum sulfate and activated carbon impregnated with aluminum sulfate or the like are also preferable.

The metallic oxide represented by the formula (I) used in the invention may have dissolved metallic elements other than M and N. For example, hydrated zirconium dioxide represented by the formula: $ZrO_2 \cdot mH_2O$ according to the formula (I) may have dissolved iron.

The inorganic ion adsorbing material used in the present invention may contain two or more metallic oxides which can be represented by the formula (I). Although the distribution state of each of the metallic oxides is not particularly limited, it is preferable to form a mixture structure where a specific metallic oxide is covered with the other metallic oxide in order to obtain an inorganic ion adsorbing material which effectively utilizes the characteristics of each of the metallic oxides and has more excellent cost performance. Examples of the structures include a structure where ferrosoferric oxide is covered with hydrated zirconium dioxide.

The metallic oxides used in the present invention include also a metallic oxide having the dissolved other element, and accordingly, preferable examples include a structure where ferrosoferric oxide having dissolved zirconium is covered with hydrated zirconium dioxide having dissolved iron.

In above example, the hydrated zirconium oxide has high adsorbing performance to ions such as phosphorus, boron, fluorine and arsenic, and high durable performance to repetition use. However, the hydrated zirconium oxide is expensive. On the other hand, ferrosoferric oxide has lower adsorbing performance to ions such as phosphorus, boron, fluorine and arsenic and lower durable performance to repetition use than those of hydrated zirconium dioxide. However, ferrosoferric oxide is very inexpensive.

Therefore, when ferrosoferric oxide is covered with hydrated zirconium dioxide, hydrated zirconium dioxide having high adsorbing performance and durable performance is formed in the vicinity of the surface of the inorganic ion adsorbing material involving the adsorption of ions. On the other hand, inexpensive ferrosoferric oxide is formed inside the inorganic ion adsorbing material which does not involve the adsorption. Thereby, there is obtained a porous formed article which can be used as an adsorbent having high adsorbing performance and durable performance, being inexpensive, that is, extremely excellent cost performance.

From a viewpoint of obtaining an adsorbent having excellent cost performance for adsorbing and removing ions which are harmful to the environment or health such as phosphorus, boron, fluorine and arsenic, it is preferable that the inorganic ion adsorbing material used in the present invention has the following structure. In the structure, a metallic oxide in which at least one of M and N in the formula (I) is a metallic element selected from the group consisting of aluminum, silicon and iron is covered with a metallic oxide in which at least one of M and N in the formula (I) is a metallic element selected from the group consisting of titanium, zirconium, tin, cerium, lanthanum and yttrium.

When as for the content ratio of the metallic element selected from the group consisting of aluminum, silicon and iron in the inorganic ion adsorbing material in this case, the total number of moles of a metallic element selected from the group consisting of aluminum, silicon and iron and metallic element selected from the group consisting of titanium, zirconium, tin, cerium, lanthanum and yttrium is set to T, and the number of moles of a metallic element selected from the group consisting of aluminum, silicon and iron is set to F, F/T (molar ratio) is preferably in a range of 0.01 to 0.95, more preferably in a range of 0.1 to 0.90, still more preferably 0.2 to 0.85, and particularly preferably 0.3 to 0.80. The excessive increase in the value of F/T (molar ratio) tends to reduce adsorbing performance and durable performance, and the decrease in the value reduces an effect over the price-reduction.

Some metals include metallic oxides of a plurality of forms in which the oxidization number of the metallic element is different. However, as long as the metallic oxides can exist stably in the inorganic ion adsorbing material, the form thereof is not limited. For example, when the metallic oxide is iron oxide, it is preferable that the metallic oxide is hydrated ferric oxide ($FeO_{1.5} \cdot mH_2O$) or hydrated ferrosoferric oxide ($FeO_{1.33} \cdot mH_2O$) because of an issue in oxidation stability in air.

The inorganic ion adsorbing material of the present invention may contain impurity elements mixed by the producing method or the like in the range where the attainment of the object of the present invention is not deviated. Examples of the impurity elements which may be mixed include nitrogen (nitrate, nitrite and ammonia), sodium, magnesium, sulfur, chlorine, potassium, calcium, copper, zinc, bromine, barium and hafnium.

The specific surface area of the inorganic ion adsorbing material influences adsorption performance and durable performance, and accordingly, the specific surface area is preferably within the fixed range. Specifically, the BET specific surface area determined by a nitrogen adsorption method is preferably 20 to 1000 m$^2$/g, more preferably 30 to 800 m$^2$/g, still more preferably 50 to 600 m$^2$/g, and particularly preferably 60 to 500 m$^2$/g. The excessive decrease in the BET specific surface area reduces adsorbing performance, and the excessive increase in the BET specific surface area increases solubility to acid or alkali, and as a result, the durable performance to repetition use is reduced.

A method of producing a metallic oxide represented by the formula (I) used in the present invention is not particularly limited, but it is produced, for example, by the method described below. A precipitate obtained by adding an alkaline solution into an aqueous solution of a salt such as a chloride, a sulfate and a nitrate of metal is filtrated, cleaned, and then dried. As for the drying method, air-drying, or drying at about 150° C. or less, preferably about 90° C. or less for about 1 to 20 hours is employed.

Next, there will be described a method of producing an inorganic ion adsorbing material having a structure where a metallic oxide in which at least one of M or N in the formula (I) is a metallic element selected from the group consisting of aluminum, silicon and iron is covered with a metallic oxide in which at least one of M or N in the formula (I) is a metallic element selected from the group consisting of titanium, zirconium, tin, cerium, lanthanum and yttrium using the case of producing an inorganic ion adsorbing material having a structure where ferrosoferric oxide is covered with zirconium dioxide.

First, there is produced a salt aqueous solution prepared by mixing a salt such as the chloride, nitrate and sulfate of zirconium, and a salt such as the chloride, nitrate, and sulfate of iron so that the above F/T (molar ratio) is set to a desired value. Then, an alkaline aqueous solution is added to adjust pH to 8 to 9.5, preferably 8.5 to 9 and to generate a precipitate. Then, while the temperature of the aqueous solution is set to 50° C. and the pH is kept at 8 to 9.5, preferably 8.5 to 9, air is blown into the aqueous solution. The liquid phase is subjected to an oxidation treatment while the ferrous ion can be detected. The produced precipitate is filtrated, washed with water and then dried. As for the drying method, air-drying, or drying at about 150° C. or less, preferably about 90° C. or less for about 1 to 20 hours is employed. A water content of the dried precipitate after having been dried is preferably in a range of about 6 to 30% by weight. The water content after having been dried is a weight reducing rate in heating the dried precipitation from room temperature to 1000° C.

Examples of the salts of zirconium used in the above producing method include zirconium oxychloride ($ZrOCl_2$), zirconium tetrachloride ($ZrCl_4$), zirconium nitrate ($Zr(NO_3)_4$) and zirconium sulphate ($Zr(SO_4)_2$). These metal salts may be hydrate salts such as $Zr(SO_4)_2 \cdot 4H_2O$. The metal salts are normally used in a form of a solution of about 0.05 to 2.0 mol per 1 L.

Examples of the salts of the iron used in the above producing method include ferrous salts such as ferrous sulfate ($FeSO_4$), ferrous nitrate ($Fe(NO_3)_2$) and ferrous chloride ($FeCl_2$). These may be also a hydrate salt such as $FeSO_4 \cdot 7H_2O$.

The ferrous salts are normally added in a form of a solid but may be added in a solution state.

Examples of the alkalis include sodium hydroxide, potassium hydroxide, calcium hydroxide, ammonia and sodium carbonate. These alkalis are used in an aqueous solution containing preferably about 5 to 20% by weight of each. When an oxidizing gas is blown, the blowing time is normally about 1 to 10 hours, though depending on a type of the oxidizing gas.

Examples of the oxidizing agents to be used include hydrogen peroxide, sodium hypochlorite and potassium hypochlorite.

An inorganic ion adsorbing material according to the present invention is preferably a fine particle as much as possible, and has a particle diameter in a range of 0.01 to 100 µm, preferably in a range of 0.01 to 50 µm, and more preferably in a range of 0.01 to 30 µm.

When the particle diameter is smaller than 0.01 µm, slurry used in the production tends to increase its viscosity and be hardly formed into an article. When the particle diameter is larger than 100 µm, the inorganic ion adsorbing material reduces its specific surface area, and tends to decrease the adsorbing performance.

The particle diameter herein refers to the particle diameter of both or a mixture of a primary particle and a secondary particle which is an aggregate of the primary particles. The particle diameter of an inorganic ion adsorbing material contained in a porous formed article used in the present invention is a mode diameter (modal particle diameter) of a sphere-equivalent diameter determined from an angle distribution of scattered light intensity in diffraction with the use of a laser beam.

Examples of the poor solvents to be used in the method according to the present invention include water; alcohols such as methanol and ethanol; ethers; and aliphatic hydrocarbons such as n-hexane and n-heptane; each of which is such a liquid as not to dissolve an organic polymer resin therein. However, it is preferable to use water. In addition, it is possible to control a rate of solidifying the organic polymer resin by adding a small amount of the good solvent for the organic polymer resin into the poor solvent. A mixture ratio (percentage of good solvent/water) of the good solvent for the polymer resin to water is preferably 0 to 40%, and more preferably is 0 to 30%. When the mixture ratio is higher than 40%, the rate of the solidification is decreased, so that the shape of a formed article tends to be distorted, because when a polymer solution formed into a droplet or the like enters into the poor solvent and while it moves therein, the formed article receives frictional force occurring between itself and the poor solvent.

A temperature of the poor solvent is not particularly limited, but is preferably −30° C. to 90° C., more preferably 0° C. to 90° C., and still more preferably 0° C. to 80° C. When the temperature of the poor solvent is higher than 90° C. or less than −30° C., it is difficult to stabilize a condition of the formed body in the poor solvent.

Next, an ion adsorption treatment by using a porous formed article according to the present invention as an adsorbent will be described.

The porous formed article used in the present invention is suitable for use as the adsorbent which is contacted with water to adsorb and remove ions in water.

An ion to be adsorbed by the porous formed article used in the present invention is not particularly limited, and for example, may be any of an anion and a cation. Examples of the anions include ions of various organic acids such as phosphorus (phosphate ion), fluorine (fluorine ion), arsenic (arsenate ion and arsenite ion), boron (borate ion), iodine ion, chlorine ion, sulfate ion, nitrate ion, nitrite ion and acetate.

In addition, examples of the cations include sodium, potassium, calcium, cadmium, lead, chromium, cobalt, strontium and cesium.

Particularly, an inorganic ion adsorbing material has characteristics of showing specific selectivity to a specific ion, and accordingly is suitable for removing ions such as phosphorus out of a liquid in which miscellaneous ions coexist, such as sewage water and industrial effluent.

Specifically, in order to remove the P, B, F and As ions, the inorganic ion adsorbing material is preferably a metallic oxide or a mixture of two or more metallic oxides selected from any of the groups of the following items (a) to (c):

(a) hydrated titanium oxide, hydrated zirconium oxide, hydrated tin oxide, hydrated cerium oxide, hydrated lanthanum oxide and hydrated yttrium oxide;

(b) a multiple metallic oxide of a metallic element selected from the group consisting of titanium, zirconium, tin, cerium, lanthanum and yttrium and metallic element selected from the group consisting of aluminum, silicon and iron; and (c) activated alumina.

When the porous formed article according to the present invention is used as an adsorbent for water treatment, the porous formed article is used in a form of being packed in a container. The shapes of the container and filling layer of the porous formed article are particularly limited as long as the porous formed article can be contacted with water to be treated. Examples thereof include a cylindrical, column-shaped, multiple columnar and boxy containers. Preferably, the method of packing the porous formed article in the column or the adsorption tower and passing water to be treated through it and contacting water with the porous formed article can sufficiently develop high contact efficiency that is a feature of the porous formed article.

These containers are preferably provided with a solid-liquid separation mechanism, for example, a perforated plate and a mesh or the like so that the formed article does not flow out from the container.

A material of the container is not particularly limited, but includes stainless steel, FRP (reinforced plastic with glass fiber), glass and various plastics. In consideration of acid resistance, the inner surface can be lined with rubber or a fluororesin.

The contact method of the porous formed article and water to be treated is not also particularly limited as long as the porous formed article can be contacted with the water to be treated. When the filling layer of the porous formed article is used as a fixed bed, examples thereof include a method of passing water in a rising or declining flow through the filling layers of a cylindrical, multiple columnar, boxy porous formed articles, an external pressure method of passing water through the inner pipe of the filling layer of a cylindrical porous formed article from the outside of the circumference direction, an internal pressure method of passing water to the opposite direction, and a method of horizontally passing water through a boxy filling layer. Also, the filling layer of the porous formed article may be used as a fluid bed method.

The ion adsorption treatment in the present invention generally performs a desorption treatment and activation treatment to be described later in the same site where the adsorption treatment is performed. However, when there is no sufficient space in the site or when the frequency of desorption is low and there is no sufficient time to exchange the container packed with the porous formed article, the container packed with the porous formed article can be removed from the apparatus to exchange the container with a new container packed with the porous formed article having adsorption capability. The porous formed article in the removed container can be separately treated and regenerated in the factory or the like having facilities for the desorption treatment and the activation treatment.

In the present invention, the constituting form of the means for adsorbing ions using the porous formed article as the adsorbent is not particularly limited. However, the form is preferably a merry-go-round system.

The merry-go-round system refers to a system which flows water using a plurality of adsorption treatment means connected in series, stops water flow to the means for adsorbing ions when the adsorption capability of the means for adsorbing ions connected in the previous stage is reduced, and passes water to a plurality of means for adsorbing ions in time difference sequentially from the preceding stage so as to set the means for adsorbing ions located in the subsequent stage to the initial stage to pass water, thereby continuously obtaining treatment water having stabilized water quality.

The means for adsorbing ions having the porous formed article having the reduced adsorption capability is sequentially subjected to a back washing, desorption and activation treatments or the like to regenerate the adsorption capability of the used porous formed article and make the means for adsorbing ions stand by till the turn of the next adsorption treatment. When the frequency of desorption is low and sufficient time is used for exchanging the means for adsorbing ions even in this case, only the means for adsorbing ions can be removed from the apparatus for water treatment, and the means for adsorbing ions can be also exchanged with the means for adsorbing ions having adsorption capability. As described above, the porous formed article in the removed means for adsorbing ions can be treated and regenerated in the factory or the like having facilities for the desorption treatment and the activation treatment.

As for a preferred embodiment of the merry-go-round system, with reference to FIG. 2, the case where an adsorbent filling tower is selected as the means for adsorbing ions and three adsorption resin towers are installed will be described. However, the embodiment is not limited thereto.

Figure 2:
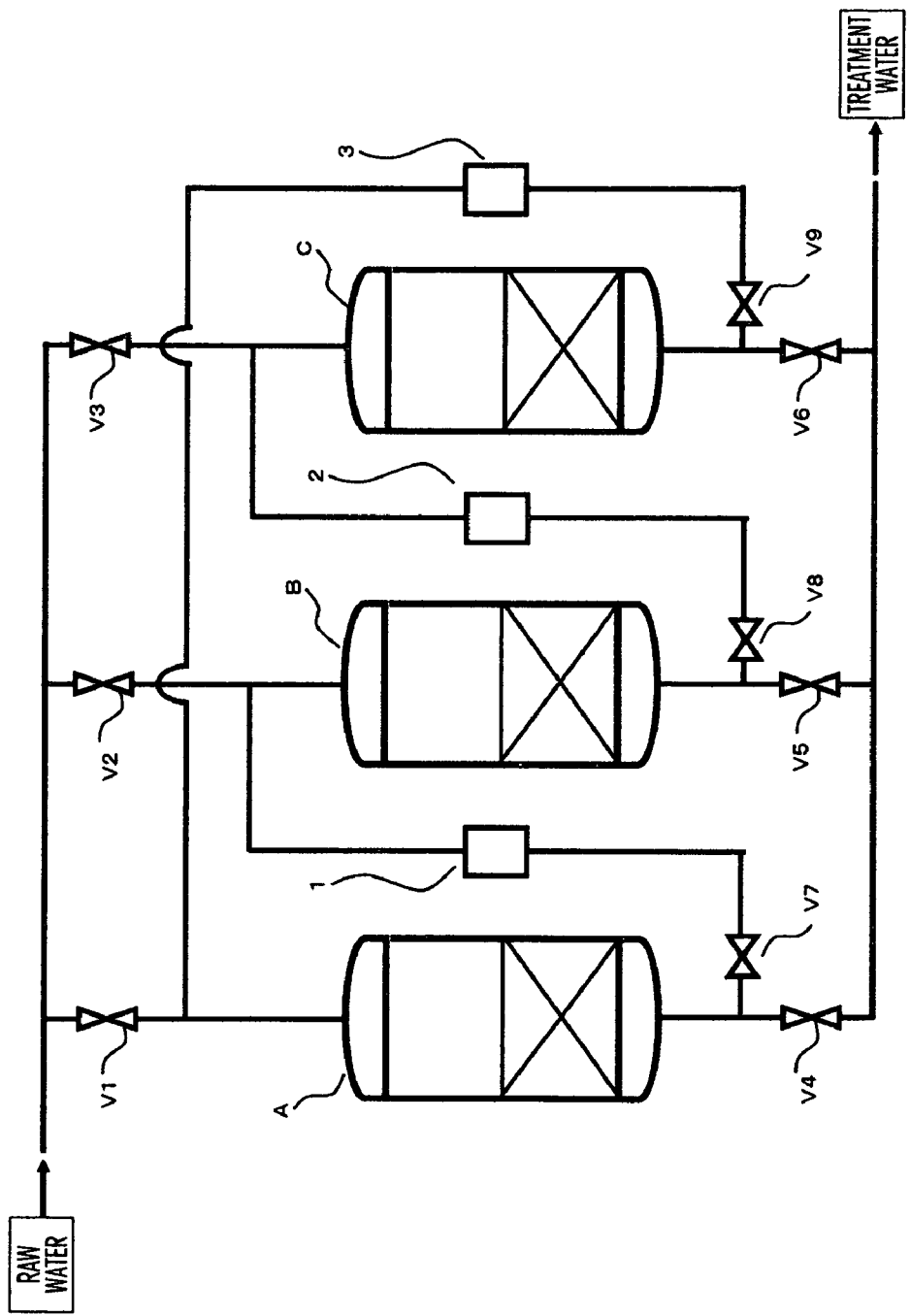
FIG. 2 is a schematic view of a merry-go-round system.

In FIG. 2, the present states of the valves are respectively V1—open, V2—close, V3—close, V4—close, V5—open, V6—close, V7—open, V8—close and V9—close. Raw water is passed in the order of the V1, an adsorption tower A, the V7, a detector 1, an adsorption tower B and the V5.

At present, the detector 1, which is installed between an adsorption tower A of the previous stage and an adsorption tower B of the subsequent stage, always monitors the water quality of the treatment water of the adsorption tower A. When the water quality of the detector 1 exceeds a specified value, it is determined that the adsorbing capacity of the adsorption tower A is filled. The states of the valves are respectively set to V1—close, V2—open, V3—close, V4—close, V5—close, V6—open, V7—close, V8—open and V9—close. The raw water is passed in the order of the value V2, the adsorption tower B, the value V8, a detector 2, an adsorption tower C and the value V6. That is, water is passed in the adsorption tower B as the previous stage and the adsorption tower C as the subsequent stage. A detector 3 is installed between the value V1 and the value V9.

In this state, the adsorption tower A where the adsorbing capacity is filled performs the back washing, desorption and activation steps. The adsorption tower A stands by until the adsorbing capacity of the adsorption tower B is filled and the water passing is started in the order of the adsorption tower C as the previous stage and the adsorption tower A as the subsequent stage.

The detector can be suitably selected according to the ion types to be treated. Specific examples include a diagometer, a phosphate ion concentration meter, a fluorine ion concentration meter and pH. The water quality of the treatment water sampled off-line can be also managed using, for example, ICP emission spectrometry or the like without being limited to on-line monitoring.

Furthermore, the detector is preferably installed for detecting the adsorption capacity of the adsorption tower of the previous stage. However, in the present invention, this detector can be omitted to manage the switching of the adsorption tower at the passing time.

Although the number of the means for adsorbing ions arranged in series is not particularly limited, the number is usually selected in a range of 2 to 5. The number of the means for adsorbing ions arranged, when exceeding 5, tends to increase the initial cost.

In the apparatus for water treatment of the present invention, it is preferable to provide means for separating and removing suspended solids in water in a previous stage of the means for adsorbing ions. The previous removal of the suspended solid in the water can prevent the clogging of the surface of the porous formed article, and can sufficiently make the porous formed article used in the present invention develop its adsorbing performance. Preferable examples of means for separating and removing the suspended solids include a coagulating-sedimentaion treatment, a sedimentation separation treatment, a sand filtration treatment and a membrane separation treatment. Particularly, a membrane separation treatment is preferable because of requiring a small installation area and providing a clean filtrate. Preferable examples of the membrane separation treatments include a reverse osmosis membrane (RO), an ultrafiltration membrane (UF) and a microfiltration membrane (MF). A form of the membrane is not limited, and includes, for example, a flat membrane, a hollow fiber, a pleat, a spiral and a tube.

In an adsorption treatment according to the present invention, it is preferable to make an inorganic ion adsorbing material adsorb ions to be removed after having adjusted pH of treatment water to a preferred pH depending on the combination of the ions to be removed and inorganic ion adsorbing material contained in the porous formed article.

When phosphorus in water is a substance to be removed and hydrated zirconium oxide or an inorganic ion adsorbing material having a structure where ferrosoferric oxide is covered with hydrated zirconium oxide is used, the range of pH to be adjusted is pH of 1.5 to 10, and more preferably is pH of 2 to 7.

When boron in water is a substance to be removed and hydrated cerium oxide or an inorganic ion adsorbing material having a structure where ferrosoferric oxide is covered with hydrated cerium oxide is used, the range of pH to be adjusted is pH of 3 to 10, and more preferably is pH of 5 to 8.

When fluorine in water is a substance to be removed and hydrated cerium oxide or an inorganic ion adsorbing material having a structure where ferrosoferric oxide is covered with hydrated zirconium dioxide is used, the range of pH to be adjusted is pH of 1 to 7, and more preferably is pH of 2 to 5.

In addition, when arsenic in water is a substance to be removed and hydrated cerium oxide or an inorganic ion adsorbing material having a structure where ferrosoferric oxide is covered with hydrated cerium oxide is used, the range of pH to be adjusted is pH of 3 to 12, and more preferably is pH of 5 to 9.

The porous formed article used in the present invention can again adsorb negative ions after having desorbed adsorbed anions by contacting itself with an alkaline aqueous solution, and subsequently having treated the adsorbent with an acidic aqueous solution (regeneration treatment). The porous formed article is thus reused to show an effect of reducing not only a cost but also waste. Particularly, the porous formed article according to the present invention is superior in durability for repeated use.

The alkaline solution (desorption solution) can desorb the anions as long as the pH is in a range of 10 or more, but the pH range is preferably 12 or more, and more preferably 13 or more. The concentration of the alkaline solution is in a range of 0.1 to 30% by weight, and more preferably is in a range of 0.5 to 20% by weight. When the concentration is lower than 0.1% by weight, the alkaline solution tends to decrease its desorption efficiency, and when the concentration is higher than 30% by weight, the cost of an alkaline agent increases.

A flow rate for a desorption solution is not particularly limited, but is normally preferably in a range of 0.5 to 15 $(hr^{-1})$ by space velocity (SV). When the space velocity (SV) is lower than 0.5, the desorption treatment tends to take a long period of desorption time and make the operation inefficient. When the space velocity (SV) is higher than 15, the period of time in which the porous formed article contacts with the alkaline aqueous solution tends to be shortened, which decreases the desorption efficiency. A type of the alkaline aqueous solution used as the desorption solution is not particularly limited, but inorganic alkalis such as aqueous solution of sodium hydroxide, an aqueous solution of potassium hydroxide and ammonium hydroxide, and organic amines are generally used. Among them, sodium hydroxide and potassium hydroxide are particularly preferable, because of showing high desorption efficiency.

Although the desorption solution after being used for the desorption treatment contains the ions to be removed desorbed from the porous formed article, it is preferable that the apparatus for water treatment of the present invention has precipitating means for precipitating a hardly soluble salt of the ions to be removed in the desorption solution and solid-liquid separation means for separating the generated precipitate from an alkaline aqueous solution. Therefore, the desorption solution is easily reused, and the desorbed ions to be removed are easily recovered.

For example, a precipitation treatment and a solid-liquid separating treatment for the precipitate can be carried out as follows.

The desorption solution is contacted with the porous formed article of the present invention adsorbing the ions to be removed, and the ions to be removed are desorbed in the desorption solution. A precipitating agent is reacted with the ions to be removed to produce a precipitation is added into the solution, and the generated precipitate is separated and recovered from the alkaline aqueous solution by the solid-liquid separating treatment.

Examples of the precipitating agents include a metal hydroxide. The hydroxide of metal produces a precipitate due to the bonding of a metal salt with anions such as phosphorus, boron, fluorine and arsenic. Since the hydroxide becomes an alkali source of an alkaline aqueous solution for desorbing the adsorbed anions, a closing system can be produced by recovering and reusing the alkaline aqueous solution used for the desorption treatment. Specific examples of the precipitating agents include sodium hydroxide, aluminium hydroxide, magnesium hydroxide and calcium hydroxide.

Among them, the hydroxide of a polyvalent metal is preferable because of forming a hardly soluble precipitate, that is, a precipitate with low solubility. Specifically, aluminum hydroxide, magnesium hydroxide and calcium hydroxide are particularly preferable. Particularly, calcium hydroxide is preferable from the viewpoint of a cost.

For example, when phosphorus which is an ion to be removed exists as sodium phosphate, a desorption solution can be separated and recovered according to the following reaction formula. Furthermore, produced calcium phosphate can be reused as a fertilizer or the like.

$$6Na_3PO_4 + 10Ca(OH)_2 \rightarrow 18NaOH + Ca_{10}(OH)_2(PO_4)_6 \downarrow$$

An amount of the hydroxide of metal to be added is not particularly limited, but is 1 to 4 times weight equivalent to objective ions. When the amount to be added is equimolar or less to the objective ions, the efficiency of producing precipitate tends to decrease, when the amount to be added is more than 4 times equivalent to the objective ions, the amount is economically disadvantageous because the removing efficiency does not almost change.

The pH of a solution from which the objective ions are to be precipitated and removed is preferably 6 or more, and when considering to recover a desorption solution and reuse it, the pH is kept 12 or more and preferably is kept 13 or more. When the pH of the solution from which the objective ions are to be precipitated and removed is lower than 6, the solubility of a precipitate increases to decrease precipitation efficiency.

When precipitating and removing the objective ions, it is also possible to concurrently use an inorganic precipitating agent such as aluminum sulfate and polyaluminum chloride and a high polymer flocculating agent, in addition to the hydroxide of metal.

Furthermore, in a suitable precipitating treatment for the ions to be removed in the present invention, the desorption solution can be reused by cooling the desorption solution which is used for the desorption treatment and contains the ions to be removed to precipitate and separate the precipitate, and the ions to be removed can be separated and recovered as the precipitate.

Therefore, it is more preferable that the apparatus for water treatment of the present invention has cooling means for the desorption solution which is contacted with the porous formed article used in the means for adsorbing ions and contains the ions to be removed.

The precipitating treatment for the desorbed ions in the cooling can be particularly and suitably applied when phosphate ions adsorbed in the porous formed article are desorbed using the sodium hydroxide solution as the desorption solution.

The cooling means and method are particularly limited. However, the desorption solution can be cooled using a usual chiller and heat exchanger or the like.

The cooling temperature is not particularly limited as long as the desorbed ions can be precipitated at the temperature. However, the temperature is preferably in a range of 5 to 25° C., and more preferably in a range of 5 to 10° C. The temperature of less than 5° C. tends to require more cooling energy to become economically disadvantageous, and the temperature exceeding 25° C. tends to have a low effect for crystallizing the precipitate.

In order to effectively precipitate sodium phosphate in cooling, sodium hydroxide can be newly added to increase the concentration of the sodium hydroxide in the desorption solution.

The solid-liquid separation means of the precipitate from the desorption solution is not particularly limited. However, a filter press, sedimentation separation, centrifugal separation, a belt-press machine, a screw press machine and a membrane separation method or the like can be usually used. Particularly preferably is the membrane separation method because of saving an installation area and providing a clean filtrate.

The membrane separation method is not particularly limited, but includes an ultrafiltration membrane (UF), a microfiltration membrane (MF) and a permeable membrane. A form of the membrane is not limited, and includes, for example, a flat membrane, a hollow fiber, a pleat, a spiral and a tube. Among them, the ultrafiltration membrane (UF) and the microfiltration membrane (MF) or the like are preferred membrane separation methods, in point of a filtering speed and filtration accuracy.

On the other hand, in the apparatus of the present invention using precipitaion-sedimentaion treatment means as means for removing ingredients contained in water and combining the precipitaion-sedimentaion treatment means with means for adsorbing ions, a desorption solution which is used for a desorption treatment and contains ions to be removed can be returned to the precipitaion-sedimentaion treatment as desorption drainage as it is without subjecting the desorption solution to a precipitating treatment to subject the desorption solution to the precipitaion-sedimentaion treatment again.

A porous formed article in a container after a desorption step has been finished is alkaline, and in the state, has a low capability of adsorbing ions in raw water again. For this reason, an operation of returning pH in a column to a specified value with the use of an acid aqueous solution, that is, activation treatment is performed.

An acid aqueous solution is not particularly limited, but an aqueous solution such as sulfuric acid and hydrochloric acid is used. The concentration of the acid aqueous solution has only to be about 0.001 to 10% by weight. When the concentration is lower than 0.001% by weight, the activation step needs a large volume of water before it will be finished, and when the concentration is higher than 10% by weight, the acid aqueous solution may cause a problem with danger in handling.

A flow rate for the acidic aqueous solution is not particularly limited, but is normally preferably in a range of 0.5 to 30 ($hr^{-1}$) by space velocity (SV). When the space velocity (SV) is lower than 0.5, the activation treatment tends to take a long period of activation time and make the operation inefficient. When the space velocity (SV) is higher than 30, the period of time in which the porous formed article contacts with the acidic aqueous solution is shortened, which decreases the desorption efficiency.

A further preferable activation treatment is to activate the porous formed article while circulating a solution for activation between the column and a pH-adjusting tank.

By adopting the configuration, it becomes possible to mildly return the pH of a porous formed article in a column, which is shifted to an alkaline side during a desorption treatment, to predetermined pH in consideration of acid resistance of an inorganic ion adsorbing material.

For example, it is known that iron oxide remarkably dissolves in an acidic solution with pH of 3 or less. A conventional activation method of activating the porous formed article supporting the above described iron oxide thereon had a problem of the above described dissolution of iron, and accordingly could not help treating the porous formed article with a weak acid of pH 3 or more. However, the method requires a large volume of water, and is not economically permissible.

In contrast to such a conventional method, an activation method according to the present invention includes arranging a column and pH-adjusting tank, circulating a solution for activation between them. Accordingly, the method can activate the porous formed article while avoiding the pH range in which iron oxide dissolves in acid, further can reduce the volume of water used for the activation, and can downsize the apparatus.

A flow rate in circulating solution for activation is selected from a range of 1 to 200 ($hr^{-1}$) by space velocity (SV), and is more preferably from a range of 10 to 100 by space velocity (SV). When the space velocity (SV) is lower than 1, the acidic solution tends to take a long period of activation time and make the operation inefficient. When the space velocity (SV) is higher than 200, the activation step requires a large pump power and tends to result in inefficiency.

A series of these operations of desorption and activation can be performed in a state that an adsorbent is packed in the column. That is, the adsorption performance of the porous formed article can be easily regenerated by sequentially passing a desorption solution and an activation solution to the container packed with an adsorbent, for which the adsorption treatment has been finished. In this case, a flow direction may be an upward direction or a downward direction.

A porous formed article according to the present invention has superior chemical resistance and mechanical strength. Accordingly, the porous formed article does not almost lower the adsorption performance for ions even when the regeneration process has been repeated several tens of times to several hundreds of times.

EXAMPLES

The present invention will be described with reference to examples.

In the examples, various physical properties or the like on a formed article were measured in a method described below.

Observation of Formed Article with Scanning Electron Microscope

The formed article was observed with an S-800 type scanning electron microscope made by Hitachi, Ltd., which is a scanning electron microscope (SEM).

Cutting of Formed Article

The formed article was vacuum-dried at a room temperature, and the dried formed article was added with isopropyl alcohol (IPA) to be impregnated with IPA. Then, the formed article was sealed in a gelatin capsule with a diameter of 5 mm together with IPA, and the sealed formed article was frozen in liquid nitrogen. The frozen formed article was cut with a chisel, together with the capsule. The cut formed article was selected, and suitable one was used as a specimen for microscopy.

Opening Ratio at Surface

An image of the surface of the formed article was obtained by taking a photograph of the surface with the scanning electron microscope, and analyzing the photograph with the use of an image-analyzing software (WinROOF (trade name) made by Mitani Corp.). In more detail, the area ratio was determined by the steps of: making the software recognize the obtained SEM image as dark and light images; manually adjusting a threshold level so that a dark part can be recognized as an opening part and a light part can be recognized as a fibril; and making the software divide the image into the opening part and the a fibril part.

Opening Diameter at Surface

An opening diameter at the surface was determined by measuring it actually from the image of the surface of the formed article photographed with the use of the scanning electron microscope. When the pore has a circular shape, the diameter of the opening was used as the pore diameter, and when the pore has other shape than the circular shape, the circle-equivalent diameter of a circle having the same area was used as the pore diameter.

Particle Diameter

Particle diameters of a formed article and an inorganic ion adsorbing material were measured with a laser diffraction/scattering-type particle size distribution measuring apparatus (LA-910 (trade name) made by HORIBA Corp.). However, when the particle diameter was 1,000 μm or more, the particle diameter was decided to be the average value of the maximum diameter and the minimum diameter of the formed article, by measuring the diameters with the use of the SEM image.

Porosity

The weight (W1) of a formed article in a hydrated state was determined by spreading a sufficiently moistened formed article on dry filter paper to remove excessive moisture, and measuring the weight. Next, the formed article was vacuum-dried under room temperature for 24 hours to obtain the dried formed article. The weight of the dried formed article was measured and was decided to be the weight (W0) of the formed article in a dried state.

Subsequently, a pycnometer (Gay-Lussac type with capacity of 10 ml) was prepared, and the weight of the pycnometer packed with the pure water (25° C.) was measured, which was decided to be the weight (Ww) in a state that the pycnometer is packed with water. Then, the formed article in a state of getting wet in the pure water was charged in the pycnometer, the pure water was further packed up to a marked line, and the weight was measured and decided as (Wwm).

Subsequently, the dried formed article was obtained by taking out the formed article from the pycnometer, and vacuum-drying it under room temperature for 24 hours. The weight of the dried formed article was measured and was decided as (M).

A specific gravity ($\rho$) and a porosity (Pr) of the formed article were determined according to the following computation expressions:

$$\rho = M/(Ww+M-Wwm)$$

$$Pr = (W1-W0)/(W1-W0+W0/\rho) \times 100$$

wherein Pr is the porosity (%); W1 is the weight (g) of the formed article in the hydrated state; W0 is the weight (g) of the formed article after having been dried; $\rho$ is the specific gravity (g/cm$^3$) of the formed article; M is the weight (g) of the formed article after having been dried; Ww is the weight (g) of the pycnometer which is packed with water; and Wwm is the weight (g) of the pycnometer which contains the formed article in the hydrated state and pure water.

Supported Amount

A dried formed article was obtained by vacuum-drying a formed article under room temperature for 24 hours. The weight of the dried formed article was measured, and was decided to be the weight Wd (g) of the formed article in a dried state. Subsequently, the dried formed article was baked with the use of an electric furnace at 800° C. for two hours, and the weight of the ash was measured and was decided to be the weight Wa (g) of the ash. A supported amount was determined in the following expression:

$$\text{Supported amount (\%)} = Wa/Wd \times 100$$

wherein Wa is the weight (g) of the ash in the formed article; and Wd is the weight (g) of the formed article in a dried state.

Specific Surface Area (m$^2$/cm$^3$)

A specific surface area $S_{BET}$ (m$^2$/g) of the porous formed article was determined by BET method with the use of Coulter SA3100 (trade name) made by Beckman Coulter, Inc., after the formed article was vacuum-dried at room temperature.

Next, an apparent volume V (cm$^3$) of a formed article in a wet condition was measured with the use of a measuring cylinder or the like. Subsequently, the formed article was vacuum-dried at room temperature, and the weight W (g) was determined.

A specific surface area of the formed article according to the present invention was determined from the following expressions:

$$\text{Specific surface area (m}^2\text{/cm}^3\text{)} = S_{BET} \times \text{bulk density (g/cm}^3\text{)}$$

$$\text{Bulk density (g/cm}^3\text{)} = W/V$$

wherein $S_{BET}$ represents the specific surface area (m$^2$/g) of the formed article; W represents the weight (g) of the dried formed article; and V represents the apparent volume (cm$^3$).

Phosphor Concentration

The phosphor concentration was measured according to absorptiometry with the use of a phosphate analyzer Phosphax Compact (trade name) made by HACH Company.

Fluorine Concentration

The fluorine concentration was measured by an ion chromatography analysis method with the use of IC-7000 (trade name) made by Yokogawa Analytical Systems, Inc. ICS-A 2G (trade name) made by Yokogawa Analytical Systems, Inc. was used for a precolumn, and ICS-A23 (trade name) made by Yokogawa Analytical Systems, Inc. was used for an analytical column.

Boron Concentration

The boron concentration was measured by ICP spectrometry with the use of IRIS-INTREPID-II (trade name) made by Thermo Electron Corp (U.S.A).

Production Example 1

Production-1 of Inorganic Ion Adsorbing Material

1 L of 0.15 mol aqueous solution of zirconium oxychloride ($ZrOCl_2$) was prepared. The solution contained metallic ions of 13.7 g as zirconium. Ferrous sulfate crystal ($FeSO_4/7H_2O$) in an amount of 84.0 g was added and dissolved into the aqueous solution which was being stirred. The amount of added ferrous sulfate corresponds to 0.3 mol of ferrous ions (F/T (molar ratio): 0.67).

Next, 15% by weight of a sodium hydroxide solution was added dropwise to the aqueous solution which was being stirred, till the pH of the solution reached 9, and then a bluish green precipitate was produced. Subsequently, air in an amount of 10 L/hour was blown into the aqueous solution while heating to 50° C. When air is continuously blown into the solution, the pH of the aqueous solution decreases. In this case, the 15% by weight of sodium hydroxide solution was added dropwise into the aqueous solution to keep it to pH of 8.5 to 9. After air had been continuously blown into the solution while absorption spectrophotometry could detect the ferrous ions in the solution, the black precipitate was produced. Subsequently, the black precipitate was suction-filtrated, was cleaned with deionized water till the filtrate became neutral, and then was dried at 70° C. or less. The dried precipitate was pulverized in a ball mill for seven hours, and the powder of the inorganic ion adsorbing material with an average particle diameter of 2.8 μm was obtained. The BET specific surface area of the powder was 170 m$^2$/g.

The powder of the obtained inorganic ion adsorbing material was determined to have a structure where the iron oxide (where zirconium may be dissolved) was covered the hydrated zirconium oxide (where iron may be dissolved) by the observation and analysis results due to X-ray diffraction analysis and a transmission electron microscope equipped with an elemental analysis apparatus.

Production Example 2

Production-1 of Porous Formed Article

Ethylene-vinylalcohol copolymer (EVOH, Nippon Synthetic Chemical Industry Co., Ltd., Soarnol E3803 (trade name) in an amount of 10 g, polyvinylpyrrolidone (PVP, BASF Japan Co., Ltd., Luvitec K30 Powder (trade name) in an amount of 10 g and dimethylsulfoxide (DMSO, Kanto Chemical Co., Ltd.) in an amount of 80 g were dissolved in water heated to 60° C. in a separable flask to obtain a homogenous polymer solution.

Into the polymer solution in an amount of 100 g, the powder of the inorganic ion adsorbing material in an amount of 92 g produced in Production Example 1 was added, and the mixture was adequately mixed to form slurry. The obtained slurry mixture was heated to 40° C. and supplied into a cylindrical rotating vessel having a nozzle with a diameter of 5 mm opened on the side face. Then, the vessel was rotated to form a droplet through the nozzle by a centrifugal force (15G), and the droplet was discharged into a solidification bath accommodating water of 60° C. therein, and the slurry mixture was solidified.

The solidified article was then cleaned and classified to form a spherical porous formed article with an average particle diameter of 623 μm.

In the spherical porous formed article, the porosity was 79%; the diameter of the opening at the surface was 0.1 to 10 μm; the supported amount was 81%; the opening ratio at the surface was 54%; and the specific surface area was 62 m$^2$/cm$^3$.

When the surface and torn surface of the spherical porous formed article were observed with the use of a scanning electron microscope (SEM), a skin layer was not observed. A layer having a maximum pore diameter (void layer) was observed in the vicinity of the surface, and it was also confirmed that cavities exist in a fibril and openings exist on the surface of the fibril. It was further observed that the powder of an inorganic ion adsorbing material was supported on the outer surface of the fibril and on the surface of the cavities in the fibril.

Production Example 3

Production-2 of Inorganic Ion Adsorbing Material

Zirconium hydroxide (Doral-ZOH100 (trade name) made by Doral Company (Australia)) was dried at 70° C. at atmospheric pressure. The dried zirconium hydroxide was pulverized in a ball mill for eight hours to obtain the white powder of the hydrated zirconium dioxide with an average particle diameter of 3.7 μm. The BET specific surface area of the powder was 344 m$^2$/g.

Production Example 4

Preparation-2 of Porous Formed Article

Ethylene-vinylalcohol copolymer (EVOH, Nippon Synthetic Chemical Industry Co., Ltd., Soarnol E3803 (trade name) in an amount of 10 g, polyvinylpyrrolidone (PVP, BASF Japan Co., Ltd., Luvitec K30 Powder (trade name) in an amount of 10 g and dimethylsulfoxide (DMSO, Kanto Chemical Co., Ltd.) in an amount of 80 g were dissolved in water heated to 60° C. in a separable flask to obtain a homogenous polymer solution. Into the polymer solution in an amount of 100 g, the inorganic ion adsorbing material produced in Production Example 3 was added in an amount of 95 g, and the mixture was adequately mixed to form slurry.

The obtained slurry mixture was heated to 40° C., and was supplied into a cylindrical rotating vessel having a nozzle with a diameter of 5 mm opened on the side face. Then, the vessel was rotated to form a droplet through the nozzle by centrifugal force (15 G), the droplet was discharged into a solidification bath accommodating water of 60° C. therein, and the slurry mixture was solidified. The solidified article was then cleaned and classified to form a spherical porous formed article with an average particle diameter of 645 μm.

In the spherical porous formed article, the porosity was 80%; the diameter of the opening at the surface was 0.1 to 10 μm; the supported amount was 82%; the opening ratio at the surface was 56%; and the specific surface area was 65 m$^2$/cm$^3$.

When the surface and torn surface of the spherical porous formed article were observed with the use of a scanning electron microscope (SEM), a skin layer was not observed. A layer having a maximum pore diameter (void layer) was observed in the vicinity of the surface, and it was also confirmed that cavities exist in a fibril and openings exist on the surface of the fibril. It was further observed that the powder of an inorganic ion adsorbing material was supported on the outer surface of the fibril and on the surface of the cavities in the fibril.

Production Example 5

Production-3 of Inorganic Ion Adsorbing Material

Ceric sulfate in an amount of 0.2 mol and ammonium sulfate in an amount of 0.5 mol were dissolved in 2 L of distilled water which was being stirred. Subsequently, ammonia water was added to adjust the pH of the solution to 9, and a precipitate was obtained. The solution was matured overnight and was filtrated, and the precipitate was cleaned with deionized water till a filtrate became neutral, and then was dried at 60° C. The dried precipitate was pulverized in a ball mill for seven hours, and the powder of the hydrated cerium oxide with an average particle diameter of 2.0 μm was obtained. The BET specific surface area of the powder was 153 m$^2$/g.

Production Example 6

Production-3 of Porous Formed Article

Ethylene-vinylalcohol copolymer (EVOH, Nippon Synthetic Chemical Industry Co., Ltd., Soarnol E3803 (trade name) in an amount of 10 g, polyvinylpyrrolidone (PVP, BASF Japan Co., Ltd., Luvitec K30 Powder (trade name) in an amount of 10 g and dimethylsulfoxide (DMSO, Kanto Chemical Co., Ltd.) in an amount of 80 g were dissolved in water heated to 60° C. in a separable flask to obtain a homogenous polymer solution.

Into the polymer solution in an amount of 100 g, the powder of the hydrated cerium oxide produced in Production Example 5 was added in an amount of 125 g, and the mixture was adequately mixed to form slurry.

The obtained slurry mixture was heated to 40° C., and was supplied into a cylindrical rotating vessel having a nozzle with a diameter of 5 mm opened on the side face. Then, the vessel was rotated to form a droplet through the nozzle by centrifugal force (17.5 G), the droplet was discharged into a solidification bath accommodating water of 60° C. therein, and the slurry mixture was solidified. The solidified article was then cleaned and classified to form a spherical porous formed article with an average particle diameter of 531 μm. In the spherical porous formed article, the porosity was 79%; the diameter of the opening at the surface was 0.1 to 20 μm; the supported amount was 89%; the opening ratio at the surface was 30%; and the specific surface area was 84 m$^2$/cm$^3$.

When the surface and torn surface of the spherical porous formed article were observed with the use of a scanning electron microscope (SEM), a skin layer was not observed. A layer having a maximum pore diameter (void layer) was observed in the vicinity of the surface, and it was also confirmed that cavities exist in a fibril and openings exist on the surface of the fibril. It was further observed that the powder of an inorganic ion adsorbing material was supported on the outer surface of the fibril and on the surface of the cavities in the fibril.

Production Example 7

Production of Hollow Fiber Cartridge

The both ends of a hollow fiber were adhered and fixed by a resin to produce a cylindrical hollow fiber cartridge having an adhesive resin part with a lower part having a skirt part and having a membrane area of 0.15 m$^2$. The hollow fiber was a microfiltration membrane made of polyvinylidene fluorine and having a micropore diameter of 0.1 an outer diameter of 1.4 mm and an inner diameter of 0.8 mm. Five through holes having a diameter of 5 mm were opened along the hollow fiber in a lower adhesive fixing layer.

Example 1

Figure 3:
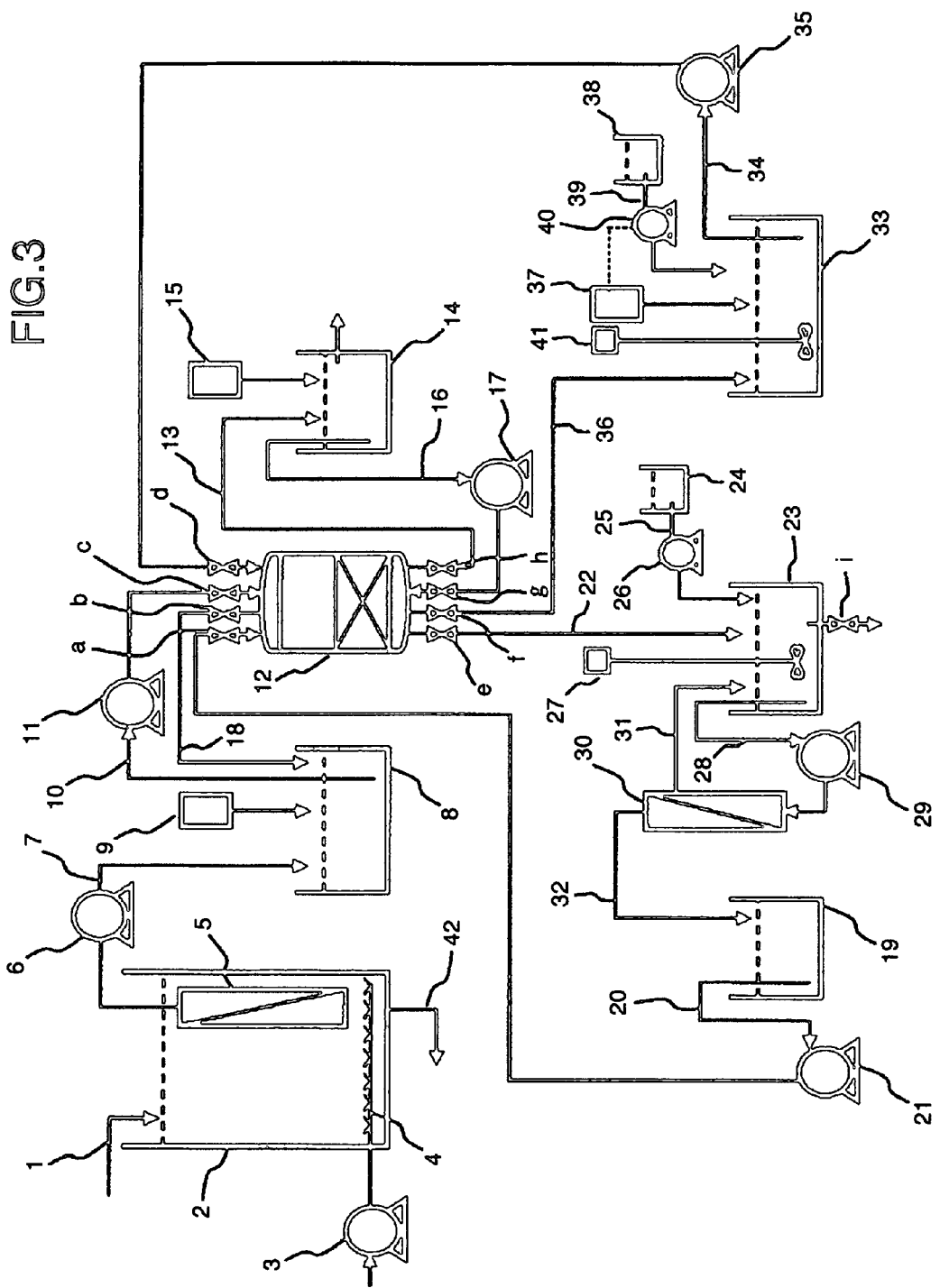
FIG. 3 is a schematic view of an apparatus for water treatment of Examples 1 and 2.

Example of an apparatus for water treatment of the present invention is shown in FIG. 3.

With reference to FIG. 3, first, an adsorption step will be described.

Effluent of a food factory was accepted in aeration tank 2 through a raw water feed passage 1, and air was supplied into an aeration tank from an aeration tube 4 using a blower 3 to subject the effluent to a biological treatment. As for the quality of the raw water, COD and phosphate ion concentration almost stably stayed in 100 to 500 mg/L and 5 mg-P/L.

The MLSS concentration in the aeration tank stayed in 10,000 mg/L.

Next, the water in the aeration tank was operated in the permeable water amount of 0.7 m$^3$/m$^2$/day by using a suction pump 6 and the hollow fiber cartridge 5 (filtration membrane) of the Production Example 7. The treatment water filtered was stored in a pH-adjusting tank 8 through a channel 7.

As for the quality of the filtrated water, a turbid component was removed to show the turbidity less than 0.1, but the quality was purified in COD of 15 mg/L and the concentration of phosphate ions of 1.5 mg-P/L.

The stored water in the pH-adjusting tank 8 was adjusted to pH 3 by sulfuric acid added with the use of a mechanism 9 for adding pH-controlling agent. The raw water having the pH adjusted was supplied to a column 12 through a pipe 10 and a pump 11. The raw water was passed through the column 12 in which 0.1 L of the porous formed article produced in Production Example 2 was charged, at the rate of 1 L/hr (SV10). The purified effluent of which the phosphate ions had been adsorbed and removed by the porous formed article was temporarily stored in a treatment water tank 14 through a channel 13, and was discharged after the pH of the effluent had been neutralized into neutrality by sodium hydroxide added with the use of a mechanism 15 for adding pH-controlling agent. The concentration of phosphate ions in the treatment water was 0.1 mg-P/L or less.

Next, a back washing step will be described. When the concentration of phosphate ions in the treatment water had exceeded 0.5 mg-P/L, a valve c and a valve h were closed to stop the supply of the raw water. Subsequently, the valve g and the valve b were opened, the treatment water in a treatment water tank 14 was supplied from a lower part of the column 12 through a channel 16 and a pump 17 at the rate of 3 L/hr (SV30), and the adsorbent in the column 12 was decompressed and cleaned. A cleaning liquid was returned to pH-adjusting tank 8 through a channel 18.

Next, a desorption step will be described. An aqueous solution of sodium hydroxide with the concentration of 5% by weight stored in a desorption solution tank 19 was supplied to a column 12 through a channel 20 and a pump 21 at the rate of 0.1 L/hr (SV1) for six hours, and was contacted with an adsorbent. The adsorbed phosphate ions were desorbed into the aqueous solution of sodium hydroxide, and the aqueous solution of sodium hydroxide was stored in a preciptation tank 23 through a channel 22.

At this time, the concentration of the phosphate ions in the preciptation tank 23 was 570 mg-P/L.

Subsequently, a precipitating step will be described. A slurry of calcium hydroxide in the concentration of 3 g/L in terms of calcium hydroxide stored in the precipitating agent tank 24 was poured into the precipitation tank 23 through a channel 25 and a pump 26, and the mixed solution was stirred with a stirrer 27 for 20 hours to make both solutes react to produce calcium phosphate. After the precipitation reaction was finished, a whitish solution including produced calcium phosphate was supplied to a membrane separation apparatus 30 which was a membrane separation apparatus (ultrafiltration membrane with nominal molecular cutoff of 6,000, made be Asahi Kasei Chemicals Corp.), through a channel 28 and a pump 29, and was separated into a solid and a liquid. The aqueous solution of sodium hydroxide after being separated into the solid and the liquid contained phosphate ions with the concentration of 10 mg-P/L and calcium ions with the concentration of 1 mg-Ca/L. The concentrated slurry of calcium phosphate separated into the solid and the liquid was circulated to the crystallization tank 23 through the channel 31. The concentrated slurry of calcium phosphate in the precipitation tank 23 was discharged from a valve i.

Next, an activation step will be described. The activating solution of in an amount of 1 L, which was adjusted to pH 3 with sulfuric acid was prepared in a pH-adjusting tank 33. The activating solution was supplied to a column 12 through a channel 34 and a pump 35 at the rate of 6 L/hr (SV60), was contacted with an adsorbent in the column, and was circulated to the pH-adjusting tank 33 through a channel 36. The activation liquid contacting with the adsorbent in the column 12 became alkaline, so that 50% by weight of an aqueous solution of sulfuric acid stored in an activation liquid storage tank 38 was supplied to the pH-adjusting tank 33 through a channel 39, to control the pH into 3 to 5 with the use of a pump 40 engaged with a pH controller 37 arranged in the pH-adjusting tank 33. The operation was repeated for 9 hours to stabilize pH in the column 12 into 5. The activation liquid was stirred with the use of a stirrer 41 in order to enhance the accuracy of pH control.

In FIG. 3, reference characters a, d, e and f denote valves, and reference numbers 32, 42 denote a channel and a sludge drawing pipe, respectively.

The above described adsorption step, back washing step, desorption step, preciptating step and activation step could be sequentially repeated to stably operate the steps for three months.

The amount of generated sludge in the operating period of three months, which was 0.60 kg/kg-SS, was lower than 0.7 kg/kg-SS of the amount of generated sludge of a standard active sludge method, and it was also confirmed that the excess amount of generated sludge could be reduced as the feature of the membrane bioreactor method of the present invention.

Example 2

The adsorption step, back washing step, desorption step, preciptating step and activation step were sequentially repeated in the same conditions as those of Example 1 except that the porous formed article produced in the Production Example 4 was used, whereby the concentration of phosphate ions of 0.1 mg-P/L or less in treatment water could be stably attained for three months as in Example 1. The amount of generated sludge in the operating period of three months was 0.58 kg/kg-SS.

Thus, the use of the apparatus for water treatment of the present invention shown in Examples 1 and 2 can reduce the excess amount of generated sludge, and stably provide treatment water having an extremely low phosphor concentration.

Example 3

Figure 4:
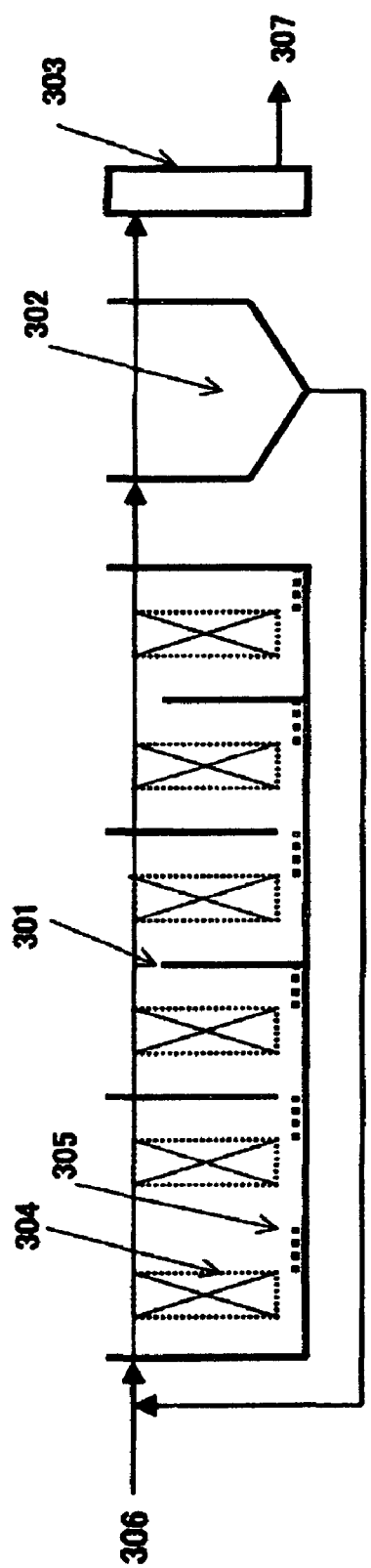
FIG. 4 is a schematic view of an apparatus for water treatment of Examples 3 and 4.

As an apparatus for water treatment, there was used an apparatus in which an aeration tank 301 composed by a tank packed with a biofilm carrier as biological treatment means, a sludge sedimentation tank 302 as sludge separating means, and a column 303 packed with a porous formed article as ion adsorption means are connected with each other as shown in FIG. 4. As for the capacity of the aeration tank, the capacity of a first tank was 6 L; the capacities of a second tank to fifth tank were respectively 3 L; and the total of the capacities was 18 L. A biofilm carrier 304 and an aeration tube 305 were installed in each of the tanks. The biofilm carrier was prepared by forming polyvinylidene chloride fiber in a loop shape having a length of 1.5 cm, fixing the part thereof to a core material with which plastic is covered and which is made of copper and having a length of 50 cm, and forming the biofilm carrier in a spiral shape having a length of 40 cm and an outer diameter of 8 cm. The capacity of the sludge sedimentation tank was 5 L. The column was packed with 0.1 L of a porous formed article produced in the Production Example 2.

Effluent 306 (BOD: 700 mg/l, n-hexane value: 50 mg/l) prepared by diluting liquid food with water was put in 12 L/day. All of the first to fifth tanks were exposed to air in the air amount of 1 to 1.5 L/min, and DO was adjusted to be set to 4 to 5 mg/l. In this state, it was observed that aeolosoma and naididae were adhered to the biofilm carrier in HRT of 36 hours and MLSS of 3000 to 5000 mg/l. The sludge sedimented in the sludge sedimentation tank was returned to the first tank by the pump in 20 L/day. Although the effluent treatment was continued for three months, the sludge was not drawn once.

As for the quality of the state, BOD and T-P of the supernatant liquid of the sludge sedimentation tank were respectively 20 mg/l and 5 mg/l. BOD and T-P of the treatment water 307 passing through the column were respectively 3 mg/l and 0.1 mg/l or less.

Example 4

An effluent treatment was continued for three months on the same conditions as those of Example 3 except that the porous formed article produced in the Production Example 4 was used, and the sludge was not drawn once. As for the quality of the state, BOD and T-P of the supernatant liquid of the sludge sedimentation tank were respectively 21 mg/l and 5 mg/l. BOD and T-P of the treatment water 307 passing through the column were respectively 3 mg/l and 0.1 mg/l or less.

Thus, it is turned out that the phosphorus concentration in treatment water can be extremely reduced without almost generating excess sludge by using the apparatus for water treatment of the present invention shown in Examples 3 and 4.

Example 5

Figure 5:
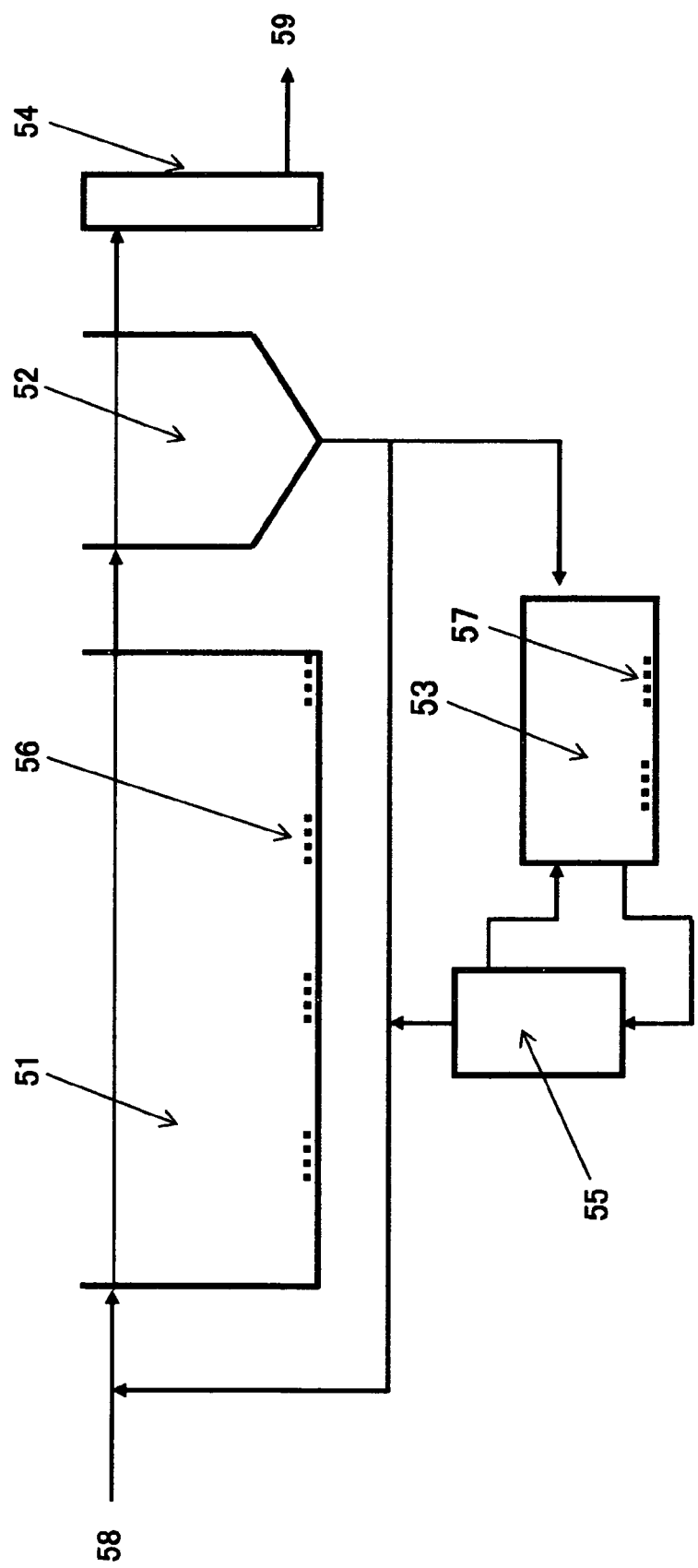
FIG. 5 is a schematic view of an apparatus for water treatment of Examples 5 and 6.

A schematic view of an effluent treating apparatus used in Example 5 is shown in FIG. 5. Reference number 51, 52, 53 and 54 denote an aeration tank which is biological treatment means, a sludge sedimentation tank which is sludge separating means, a solubilization treatment tank which is sludge solubilizing means (using a thermophile method), and a column packed with the porous formed article produced in the Production Example 2 which is ion adsorption means. Reference number 55 denotes a membrane filter. Reference numbers 56, 57 denote an aeration tube.

In Example 5, the BOD concentration of effluent 58 flowing into the aeration tank 51 was 200 mg/L. As for the effluent, meat extract: peptone was set to 1:1 (weight ratio), and a model liquid in which inorganic salts were further added so that the BOD concentration: the nitrogen concentration: the phosphor concentration was set to 100:5:1 was used. The effluent was supplied to the aeration tank 51 in an inflow amount of 70 L/day. The capacity of the aeration tank was 20 L. The liquid flowing out of the aeration tank 51 was sent to the sludge sedimentation tank 52, and was divided into the supernatant liquid and the sludge. A part of the sludge settled and separated in the sludge sedimentation tank 52 was returned to the aeration tank 51 as return sludge. The remainder thereof was passed through a liquid-sending line, and was sent to the solubilization treatment tank 53 at the flow rate of 0.8 L/day in 1% by weight of suspended solids (SS). Air of 0.05 L/min was sent to the solubilization treatment tank 53 by an air pipe from an aeration apparatus, and warm water was put into a jacket of the solubilization treatment tank 53 for keeping the temperature so that the temperature of 60° C. could be kept. The liquid passing through the solubilization treatment tank 53 was sent to a membrane filter 55 while sending air of 10 L/min from by an air pump installed on the course of the liquid-sending line.

The sludge separated in the sludge sedimentation tank 52 was made to be suitably sent to the solubilization treatment tank 53 by the pump. The membrane concentrate in the membrane filter 55 was sent to the solubilization treatment tank 53 through a membrane filter concentrate line. A membrane filtrate was sent to the aeration tank 51 through a membrane filtrate line. As for the continuous operating condition of the membrane separation apparatus, the amount of the membrane filtrate was 0.8 L/day. The amount of the membrane concentrate of 3 L/hr was sent to the solubilization treatment tank 53. As a filtration membrane module used for the membrane filter, there was used SLP-1053 (membrane area: 0.1 m$^2$, molecular cutoff: 10,000) which is a hollow fiber type ultrafiltration membrane made of polysulphone and made by Asahi Chemical Chemicals. The column 54 was packed with 0.1 L of the porous formed article.

In this state, a continuous operation was performed for ten days. The result shows a value obtained by setting the state since the fifth day to a stationary state and averaging the fifth to tenth days. SS of the liquid entering the solubilization treatment tank 53 was 12,000 mg/L. By contrast, SS of the membrane filtrate was 0 mg/L. BOD of the membrane filtrate was 30 mg/L. Although the effluent treatment was continued for ten days, the sludge was not drawn once. As for the quality of the state, COD and T-P of the supernatant liquid of the sludge sedimentation tank were respectively 8 mg/l and 1 mg/l. COD and T-P of the treatment water 59 passing through the column were respectively 7 mg/l and 0.1 mg/l or less.

Example 6

An effluent treatment was continued for ten days on the same conditions as those of Example 5 except that the porous formed article produced in the Production Example 4 was used, and the sludge was not drawn once.

As for the quality of the state, COD and T-P of the supernatant liquid of the sludge sedimentation tank were respectively 8 mg/l and 1 mg/l. COD and T-P of the treatment water 59 passing through the column were respectively 7 mg/l and 0.1 mg/l or less.

Thus, it is turned out that the phosphor concentration in treatment water can be extremely reduced without almost generating excess sludge by using the apparatus for water treatment of the present invention shown in Examples 5 and 6.

Example 7

First, a phosphor adsorption test of the porous formed article produced in Production Example 2 was carried out on the following conditions.

A model liquid, that is, a stock solution to be adsorbed was prepared by dissolving trisodium orthophosphate ($Na_3PO_4 \cdot 12H_2O$) in distilled water to prepare a liquid with a phosphorus concentration of 9 mg-P/L, and adjusting the pH of the liquid to 7 with sulfuric acid.

The prepared porous formed article in an amount of 8 ml was charged in a column (with inside diameter of 10 mm), and the above described stock solution to be adsorbed was passed therethrough at a rate of 240 ml/hr (SV30). An effluent (treated liquid) from a column was sampled every 30 minutes, the concentration of phosphate ions (concentration of phosphor) in the treatment water was measured, and an amount of water passing therethrough (adsorbed amount) before the concentration of phosphate ions exceeding 0.5 mg-P/L was determined.

After the above described adsorption operation, the formed article was immersed in 7% by weight of an aqueous solution of sodium hydroxide for two hours to desorb adsorbed phosphoric acid, and then was cleaned with distilled water. Subsequently, the formed article was immersed in 0.1% by weight of an aqueous solution of sulfuric acid for five hours, and was thus regenerated. Then, the formed article was washed again with distilled water.

The above described operations of adsorption, desorption and regeneration were repeated 50 times, and the adsorbed amount after the first and 50th operations and the rate of change between them were examined.

The above rate of the change in the adsorbed amount is expressed by the following expression:

Rate of change of adsorbed amount=(amount at 50th adsorption operation)/(amount at first adsorption operation)×100.

As the result, the amount at first adsorption was 940 mg-P/L-adsorbent; the amount at 50th adsorption was 910 mg-P/L-adsorbent; and the rate of change of the adsorbed amount was 97%. Adsorbing capacity at the 50th operation did not change from that at the first operation, which identified that the present adsorbent has high durability.

Figure 6:
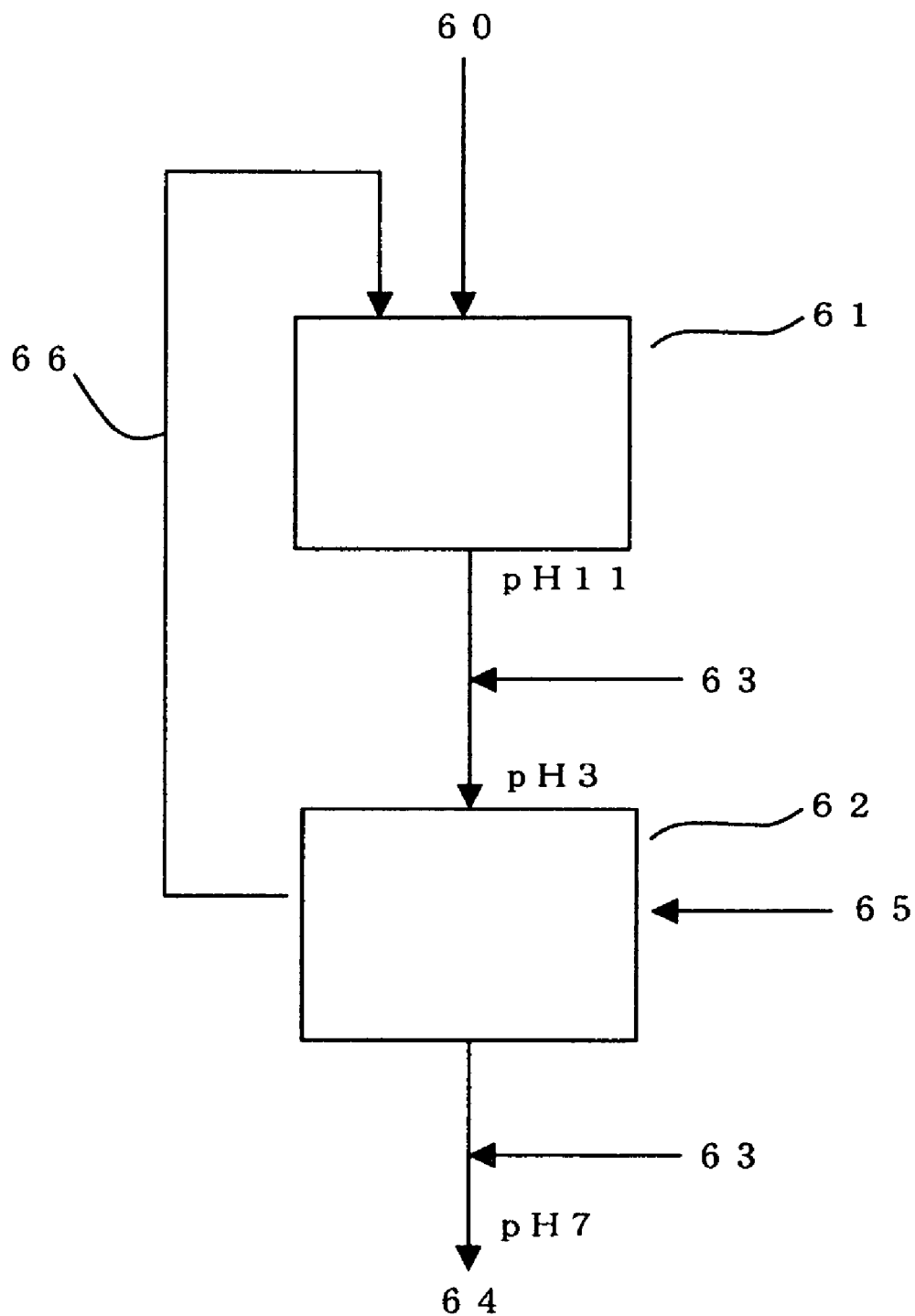
FIG. 6 is a schematic view of flow of an apparatus for water treatment of Examples 7 and 8.

Next, as shown in a schematic flow of FIG. 6, an apparatus for water treatment of the present invention combining a precipitaion-sedimentaion treatment with an ion adsorption treatment using the porous formed article produced in the Production Example 2 as the adsorbent was produced. This apparatus treated fluorine-containing effluent 60. In this apparatus, a desorption solution 65 used for desorption of the fluorine adsorbed to the porous formed article by the ion adsorption treatment is used for a desorption treatment. The desorption solution 65 is then returned to a precipitaion-sedimentaion treatment as desorption drainage 66 containing the desorbed fluorine, and the desorption solution 65 is subjected to the precipitaion-sedimentaion treatment again.

The effluent 60 containing the fluorine of 100 mg/L was supplied to an apparatus for water treatment (precipitaion-sedimentaion treatment step) 61 of the present invention.

In the precipitaion-sedimentaion treatment, calcium hydroxide as a calcium salt in an amount of 9 kg/m$^3$-effluent, and aluminum sulfate as an aluminum salt in an amount of 5 kg/m³-effluent were used. The fluorine concentration in the treatment water after the precipitaion-sedimentaion treatment was 11 mg/L.

The pH of the treatment water subjected to the precipitaion-sedimentaion treatment was 11. After adjusting the pH of the treatment water to 3 using a pH adjuster 63, the treatment water was subjected to an ion adsorption treatment by passing the treatment water through a column (ion adsorption treatment step) 62 (inner diameter: 10 mm) packed with 8 ml of a porous formed article at the rate of SV20, and the pH was adjusted to 7 to obtain final treatment water. The fluorine concentration in the final treatment water 64 was less than 1 mg/L. Sulfuric acid and sodium hydroxide were used for adjusting the pH.

Example 8

The same apparatus for water treatment as that of Example 7 was produced except that the porous formed article produced in the Production Example 6 was used as the adsorbent. This apparatus treated fluorine-containing effluent.

The effluent containing the fluorine of 80 mg/L was supplied to the apparatus for water treatment of the present invention.

In the precipitaion-sedimentaion treatment, calcium hydroxide as a calcium salt in an amount of 7 kg/m³-effluent, and aluminum sulfate as an aluminum salt in an amount of 4 kg/m³-effluent were used. The fluorine concentration in the treatment water subjected to the precipitaion-sedimentaion treatment was 9 mg/L.

The pH of the treatment water subjected to the precipitaion-sedimentaion treatment was 11. After adjusting the pH of the treatment water to 3, the treatment water was subjected to an ion adsorption treatment by passing the treatment water through a column (inner diameter: 10 mm) packed with 8 ml of a porous formed article at the rate of SV40 to obtain final treatment water. The fluorine concentration in the final treatment water was less than 1 mg/L. Sulfuric acid and sodium hydroxide were used for adjusting the pH.

Example 9

Boric acid ($H_3BO_4$) was dissolved in distilled water to form an aqueous solution of boric acid (22 mg-B/L as boron), and the pH of the solution was adjusted to 3, 5 and 7 with the use of sulfuric acid and sodium hydroxide. To the aqueous solution in the amount of 1 L, 2 ml of the porous formed article produced in the Production Example 6 was added, and the mixture was stirred in a shaker. Two hours later after having started being stirred, the aqueous solution was sampled, the concentration of boric acid was measured, and the amount of adsorbed boric acid was determined. The amounts of adsorbed boric acid at pH 3, 5 and 7 were respectively 0.4 g-B/L; 0.4 g-B/L and 0.7 g-B/L, and it was found that borate ions are much adsorbed in a neutral region.

Figure 7:
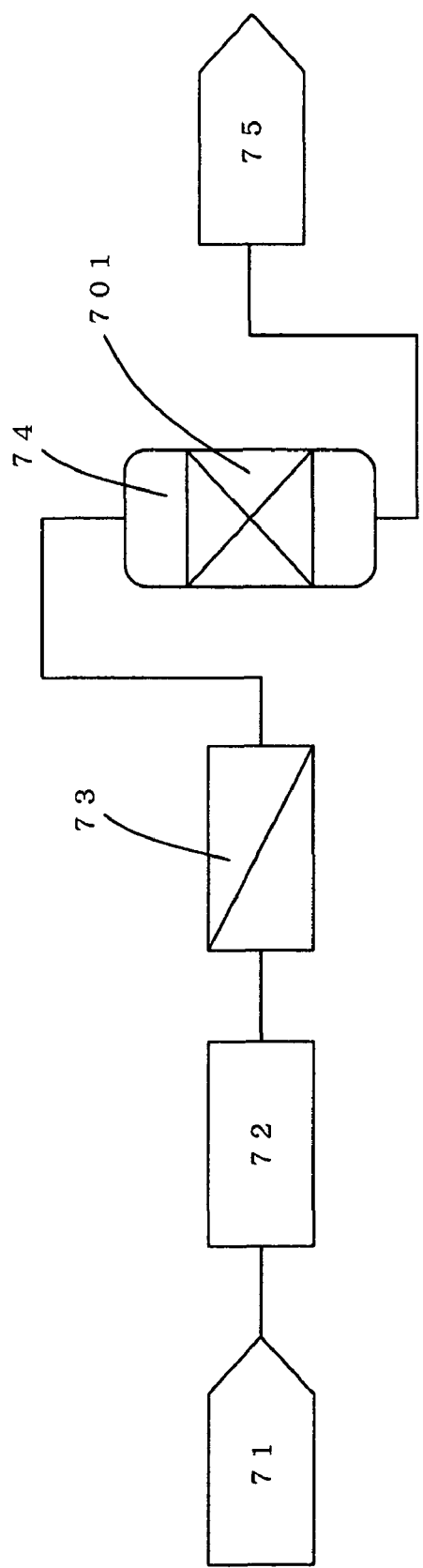
FIG. 7 is a schematic view of flow of an apparatus for water treatment of Example 9.

Next, as shown in a schematic flow of FIG. 7, there was produced an apparatus for water treatment of the present invention combining a reverse osmosis membrane treatment and an ion adsorption treatment using the porous formed article produced in the Production Example 6 as an adsorbent. This apparatus subjected sea water to a water conversion treatment.

Seawater 71 (boron concentration: 4.4 mg-B/g) as raw water to be treated was supplied to this apparatus.

The passing flow rate was set to 5 m³/day using a UF membrane (microfiltration membrane: molecular cutoff of 150,000) as a pretreatment filtration treating apparatus 72.

An apparatus 73 using a reverse osmosis membrane (hollow type HR5355 (trade name) made by Toyobo Co., Ltd. subjected the sea water to a reverse osmosis membrane treatment. The boron concentration in supply water to the apparatus was 4.4 mg-B/g, and the boron concentration in water after being treated was 1.9 mg-B/g. That is, the boron concentration was not set to the recommendation value or less of WHO by only the treatment.

An ion adsorption apparatus 74 using the porous formed article 701 produced in Production Example 6 of manufacture as the adsorbent subjected the water subjected to the reverse osmosis membrane treatment to an ion adsorption treatment.

This treatment was performed on the following conditions.
adsorbent to be used: porous formed article produced in Production Example 6
tower column: 22 Φ×1000 Lmm
thickness of adsorbent layer: 600 mm
amount of adsorbent: 228 ml
passing rate: SV20, 4.56 L/h The boron concentration in water (freshwater) 75 subjected to an ion exchange treatment was less than 0.01 mg-B/L.

INDUSTRIAL APPLICABILITY

The apparatus for water treatment and method of treating water of the present invention can be preferably used in various purification fields for water.

The invention claimed is:

1. An apparatus for water treatment comprising:
means for removing ingredients contained in water; and
means for adsorbing ions with a porous formed article as an adsorbent, wherein
the porous formed article comprises a fibril containing an organic polymer resin, and an inorganic ion adsorbing material;
the fibril forms a three-dimensional network structure;
the fibril forms communicating pores opening at an outer surface of the article and has inner cavities, each of which cavities opens at the surface of the fibril through at least a part of the each cavity; and
the inorganic ion adsorbing material is supported on the outer surface of the fibril and on the surface of inner cavities of the fibril.

2. The apparatus for water treatment according to claim 1, wherein the porous formed article has a layer having a maximum pore diameter of a communicating pore in the vicinity of the surface of the formed article.

3. The apparatus for water treatment according to claim 1, wherein the organic polymer resin comprises at least one selected from the group consisting of an ethylene-vinylalcohol copolymer (EVOH), polyacrylonitrile (PAN), polysulphone (PS) and polyvinylidene difluoride (PVDF).

4. The apparatus for water treatment according to claim 1, wherein
the inorganic ion adsorbing material comprises at least one of metallic oxides represented by the following formula (I):

$$MN_xO_n \cdot mH_2O \tag{I}$$

wherein x is 0 to 3; n is 1 to 4; m is 0 to 6; and M and N are different from each other, and is a metallic element selected from the group consisting of Ti, Zr, Sn, Sc, Y, La, Ce, Pr, Nd, Sm, Eu, Gd, Tb, Dy, Ho, Er, Tm, Yb, Lu, Al Si, Cr, Co, Ga, Fe, Mn, Ni, V, Ge, Nb and Ta.

5. The apparatus for water treatment according to claim 4, wherein the metallic oxide represented by the formula (I) is one or a mixture of two or more selected from the following groups (a) to (c):
(a) hydrated titanium oxide, hydrated zirconium oxide, hydrated tin oxide, hydrated cerium oxide, hydrated lanthanum oxide and hydrated yttrium oxide;

(b) a multiple metallic oxide of a metallic element selected from the group consisting of titanium, zirconium, tin, cerium, lanthanum and yttrium and a metallic element selected from the group consisting of aluminum, silicon and iron; and
(c) activated alumina.

6. The apparatus for water treatment according to claim 1, wherein the fibril comprises the organic polymer resin, the inorganic ion adsorbing material and a water-soluble polymer.

7. The apparatus for water treatment according to claim 1, wherein the means for removing ingredients contained in water is a combination of biological treatment means and sludge separating means.

8. The apparatus for water treatment according to claim 7, wherein the biological treatment means comprises two or more aeration tanks.

9. The apparatus for water treatment according to claim 7, wherein the biological treatment means comprises an aeration tank in which a biofilm carrier is immersed.

10. The apparatus for water treatment according to claim 9, wherein the biofilm carrier comprises a core material and a fiber-like material partially fixed to the core material, and the fiber-like material thickly grows around the core material.

11. The apparatus for water treatment according to claim 10, wherein the core material has a helical shape.

12. The apparatus for water treatment according to claim 10, wherein the fiber-like material is polyvinylidene chloride.

13. The apparatus for water treatment according to claim 7, wherein the sludge separating means is a membrane separation apparatus having a sedimentation tank and/or a separation membrane.

14. The apparatus for water treatment according to claim 13, wherein the separation membrane of the membrane separation apparatus comprises at least one selected from the group consisting of polyacrylonitrile (PAN), polysulphone (PS), polyvinylidene difluoride (PVDF), polyethylene (PE) and polypropylene (PP).

15. The apparatus for water treatment according to claim 13, wherein a form of the separation membrane is a hollow fiber form.

16. The apparatus for water treatment according to claim 13, wherein the separation membrane is a membrane cartridge prepared by adhering and fixing both ends of a plurality of hollow fibers vertically arranged, and has a cartridge head liquid-tightly adhered and fixed to an outer circumference of a first end part and a skirt fixed to an outer circumference of a second end part; the cartridge head is separated from the skirt; an end part of the hollow fiber of the side of the cartridge head is opened; a hollow part of an end part of the hollow fiber of the side of the skirt is sealed; and a plurality of through holes are formed in an adhesive fixing layer of the side of the skirt.

17. The apparatus for water treatment according to claim 7, further comprising sludge solubilizing means.

18. The apparatus for water treatment according to claim 17, wherein the sludge solubilizing means is at least one selected from a mechanical cell destructive method, an ultrasonic method, an ozone method, a hydrothermal oxidation method, a chemical agent adding method and a thermophile method.

19. The apparatus for water treatment according to claim 1, wherein the means for removing ingredients contained in water is precipitation-sedimentation treatment means.

20. The apparatus for water treatment according to claim 19, further comprising means for returning desorption drainage containing ions, to be removed, the ions generated in regenerating the porous formed article used in the means for adsorbing ions, to the precipitation-sedimentation treatment means.

21. The apparatus for water treatment according to claim 1, wherein the means for removing ingredients contained in water is demineralization treatment means.

22. The apparatus for water treatment according to claim 1, wherein the means for removing ingredients contained in water is direct purifying means.

23. The apparatus for water treatment according to claim 1, wherein the apparatus for water treatment has means for separating and removing suspended solids in water, said means installed in a previous stage of the means for adsorbing ions.

24. The apparatus for water treatment according to claim 1, wherein said means for adsorbing ions is a plurality of means for adsorbing ions connected in series and is of a merry-go-round system.

25. The apparatus for water treatment according to claim 24, wherein ion directing means for monitoring a concentration of ions in treatment water is installed in the means for adsorbing ions of the initial stage.

26. The apparatus for water treatment according to claim 1, wherein the apparatus for water treatment has means for crystallizing desorbed ions from a desorption solution brought in contact with the porous formed article used in the means for adsorbing ions, and solid-liquid separation means for a crystallized substance.

27. The apparatus for water treatment according to claim 26, further comprising means for cooling the desorption solution.

28. A method of treating water comprising:
a step of removing ingredients contained in water; and
an ion adsorption treatment step of using a porous formed article as an adsorbent, wherein
the porous formed article comprises a fibril containing an organic polymer resin, and an inorganic ion adsorbing material;
the fibril forms a three-dimensional network structure;
the fibril forms communicating pores opening at an outer surface of the article and has inner cavities, each of which cavities opens at the surface of the fibril through at least a part of the each cavity; and
the inorganic ion adsorbing material is supported on the outer surface of the fibril and on the surface of the inner cavities of the fibril.

29. The method of treating water according to claim 28, wherein the step of removing ingredients contained in water is a combination of a biological treatment step and a sludge separating step.

30. The method of treating water according to claim 29, further comprising a sludge solubilizing step.

31. The method of treating water according to claim 28, wherein the step of removing ingredients contained in water is a demineralization treatment step.

32. The method of treating water according to claim 28, wherein the step of removing ingredients contained in water is a precipitation-sedimentation treatment step.

33. The method of treating water according to claim 32, further comprising the step of returning desorption drainage containing ions to be removed, the ions generated in regenerating the porous formed article used in the ion adsorption treatment step, to the precipitation-sedimentation treatment step.

34. The method of treating water according to claim 28, wherein the step of removing ingredients contained in water is a direct purifying step.

* * * * *

UNITED STATES PATENT AND TRADEMARK OFFICE
CERTIFICATE OF CORRECTION

PATENT NO.         : 7,967,984 B2                            Page 1 of 1
APPLICATION NO.    : 11/922096
DATED              : June 28, 2011
INVENTOR(S)        : Ichiro Midorikawa et al.

It is certified that error appears in the above-identified patent and that said Letters Patent is hereby corrected as shown below:

In claim 4, column 38, line 55, "$MN_xO_N.mH_2O$" should read -- $MN_xO_N \cdot mH_2O$ --.

In claim 4, column 38, line 59, "AI Si," should read -- AI, Si, --.

Signed and Sealed this
Twentieth Day of September, 2011

David J. Kappos
*Director of the United States Patent and Trademark Office*

UNITED STATES PATENT AND TRADEMARK OFFICE
CERTIFICATE OF CORRECTION

PATENT NO.         : 7,967,984 B2                                                Page 1 of 1
APPLICATION NO.    : 11/922096
DATED              : June 28, 2011
INVENTOR(S)        : Ichiro Midorikawa et al.

It is certified that error appears in the above-identified patent and that said Letters Patent is hereby corrected as shown below:

In claim 4, column 38, line 55, "$MN_xO_N.mH_2O$" should read -- $MN_xO_N \cdot mH_2O$ --.

In claim 4, column 38, line 59, "AlSi," should read as -- Al, Si, --.

This certificate supersedes the Certificate of Correction issued September 20, 2011.

Signed and Sealed this
Eighteenth Day of October, 2011

David J. Kappos
*Director of the United States Patent and Trademark Office*